United States Patent
Tin et al.

(10) Patent No.: US 10,168,146 B2
(45) Date of Patent: Jan. 1, 2019

(54) MEASURING SHAPE OF SPECULAR OBJECTS BY LOCAL PROJECTION OF CODED PATTERNS

(71) Applicant: CANON KABUSHIKI KAISHA, Tokyo (JP)

(72) Inventors: Siu-Kei Tin, Milpitas, CA (US); Jinwei Ye, San Jose, CA (US)

(73) Assignee: CANON KABUSHIKI KAISHA, Tokyo (JP)

(*) Notice: Subject to any disclaimer, the term of this patent is extended or adjusted under 35 U.S.C. 154(b) by 179 days.

(21) Appl. No.: 15/151,388

(22) Filed: May 10, 2016

(65) Prior Publication Data

US 2016/0349046 A1 Dec. 1, 2016

Related U.S. Application Data

(60) Provisional application No. 62/168,453, filed on May 29, 2015.

(51) Int. Cl.

| | |
|---|---|
| G06T 7/50 | (2017.01) |
| G06T 7/507 | (2017.01) |
| G01B 11/25 | (2006.01) |
| G06T 7/521 | (2017.01) |
| G06K 9/20 | (2006.01) |
| G06T 7/514 | (2017.01) |
| G06T 7/55 | (2017.01) |

(52) U.S. Cl.
CPC ........ *G01B 11/2513* (2013.01); *G06K 9/2036* (2013.01); *G06T 7/50* (2017.01); *G06T 7/514* (2017.01); *G06T 7/521* (2017.01); *G06T 7/55* (2017.01); *G06T 2207/10152* (2013.01)

(58) Field of Classification Search
None
See application file for complete search history.

(56) References Cited

U.S. PATENT DOCUMENTS

| | | | | |
|---|---|---|---|---|
| 5,615,003 | A * | 3/1997 | Hermary | G01B 11/245 250/559.23 |
| 2002/0030674 | A1* | 3/2002 | Shigeta | G09G 3/34 345/204 |
| 2006/0115082 | A1* | 6/2006 | Kevenaar | G07D 7/0053 380/216 |
| 2007/0091302 | A1 | 8/2007 | Harding et al. | 356/237.1 |
| 2009/0092284 | A1* | 4/2009 | Breed | B60J 10/00 382/103 |

(Continued)

OTHER PUBLICATIONS

Wetzstein et al., "Computational Plenoptic Imaging," 2012 Course Synopsis.*

(Continued)

*Primary Examiner* — Michael J Hess
(74) *Attorney, Agent, or Firm* — Fitzpatrick, Cella, Harper & Scinto

(57) ABSTRACT

The shape of a specular object is measured by illumination of the object by a light field generated by two or more spaced apart layers controllable to display multiple patterns that are predetermined relative to a bounding volume within which the object is positioned. The patterns code a sparse subset of the multitude of light rays that can be generated by the layers to those that can actually reach the bounding volume. A process is described by which a sparse coding of the light rays can be derived.

5 Claims, 14 Drawing Sheets

(56) References Cited

U.S. PATENT DOCUMENTS

| | | | | |
|---|---|---|---|---|
| 2014/0268328 A1* | 9/2014 | Dorschner | ............. | G02F 1/292 |
| | | | | 359/484.01 |
| 2015/0054946 A1* | 2/2015 | Zhang | ................... | G01B 11/25 |
| | | | | 348/136 |
| 2015/0293458 A1* | 10/2015 | Vanoppen | ........... | G03F 7/70558 |
| | | | | 355/53 |
| 2016/0054118 A1* | 2/2016 | Fuchikami | ......... | G01B 11/2536 |
| | | | | 356/610 |
| 2016/0063821 A1* | 3/2016 | MacIntosh | ........... | G06Q 20/208 |
| | | | | 705/23 |
| 2016/0076878 A1 | 3/2016 | Tin et al. | ............... | G01B 11/22 |

OTHER PUBLICATIONS

Masselus et al., "Relighting with 4D Incident Light Fields," 2003. W.*

Tensor Displays: Compressive Light Field Synthesis using Multilayer Displays with Directional Backlighting, Gordon Wetzstein, et al., SIGGRAPH 2012.

High Quality Mesostructure Acquisition Using Specularities, Yannick Francken, et al., Proc. CVPR 2008.

3D Acquisition of Mirroring Objects Using Striped Patterns, Marco Tarini, et al., 2005.

\* cited by examiner

FORWARD LUT FOR VERTICAL PATTERNS

| 1D RAY INDEX | PIXEL LOCATION AT LAYER 1 | ... | PIXEL LOCATION AT LAYER m | BINARY CODE VECTOR |
|---|---|---|---|---|
| ⋮ | ⋮ | ⋮ | ⋮ | ⋮ |
| $i$ | $j_{i1}^{(v)}$ | ... | $j_{im}^{(v)}$ | $R_i^{(v)}$ |
| ⋮ | ⋮ | ⋮ | ⋮ | ⋮ |

FIG. 7(A)

FORWARD LUT FOR HORIZONTAL PATTERNS

| 1D RAY INDEX | PIXEL LOCATION AT LAYER 1 | ... | PIXEL LOCATION AT LAYER m | BINARY CODE VECTOR |
|---|---|---|---|---|
| ⋮ | ⋮ | ⋮ | ⋮ | ⋮ |
| $i$ | $j_{i1}^{(h)}$ | ... | $j_{im}^{(h)}$ | $R_i^{(h)}$ |
| ⋮ | ⋮ | ⋮ | ⋮ | ⋮ |

FIG. 7(B)

REVERSE LUT FOR VERTICAL PATTERNS

| DECIMAL CODE | 1D RAY INDEX | PIXEL LOCATION AT LAYER 1 | ... | PIXEL LOCATION AT LAYER m |
|---|---|---|---|---|
| ⋮ | ⋮ | ⋮ | ⋮ | ⋮ |
| $[R_i^{(v)}]_{10}$ | $i$ | $j_{i1}^{(v)}$ | ... | $j_{im}^{(v)}$ |
| ⋮ | ⋮ | ⋮ | ⋮ | ⋮ |

FIG. 7(C)

REVERSE LUT FOR HORIZONTAL PATTERNS

| DECIMAL CODE | 1D RAY INDEX | PIXEL LOCATION AT LAYER 1 | ... | PIXEL LOCATION AT LAYER m |
|---|---|---|---|---|
| ⋮ | ⋮ | ⋮ | ⋮ | ⋮ |
| $[R_i^{(h)}]_{10}$ | $i$ | $j_{i1}^{(h)}$ | ... | $j_{im}^{(h)}$ |
| ⋮ | ⋮ | ⋮ | ⋮ | ⋮ |

FIG. 7(D)

MEASURING SHAPE OF SPECULAR OBJECTS BY LOCAL PROJECTION OF CODED PATTERNS

CROSS REFERENCE TO RELATED APPLICATION

This application claims priority from U.S. Provisional Application No. 62/168,453, filed May 29, 2015, the contents of which are incorporated by reference herein as if set forth in full.

FIELD

The present disclosure relates to surface profiling and measurement of the shape of highly glossy objects such as mirror-like and specular objects.

BACKGROUND

Objects fabricated from a highly glossy material, such as specular objects or mirror-like objects, have reflection characteristics that differ significantly from those fabricated from a diffuse material. For example, whereas for a diffuse material light from a directional light source such as a projector is reflected in virtually all directions, for a highly glossy material, such light is reflected in primarily only one direction or at most only a few directions. These reflections are called "specular" reflections, and are caused by the shiny surface of the glossy material, which often has a mirror-like surface finish. As a result, an image of a highly glossy object illuminated by a directional light source is often completely dark, unless the camera happens to be positioned at the precisely correct viewing direction so as to capture the specular reflection.

For these and other reasons, conventional 3D scanning methods that work well with diffuse objects, such as projection of images of structured light onto the surface of the object, or photometric stereo, do not work well with specular or highly glossy objects.

SUMMARY

Consideration has been given to a system for profiling specular objects using an LCD panel. Such a system suffers from the problem of "depth-normal ambiguity", and is consequently limited to specular objects that are substantially flat. According to the depth-normal ambiguity, given the direction an incoming ray of light reflected from a specular surface, as captured in the reflected image of a light source whose position is known, there are infinitely many plausible solutions for the distance of the surface from the camera and the normal direction of the surface.

One arrangement for profiling specular objects while addressing the depth-normal ambiguity is proposed in U.S. patent application Ser. No. 14/489,008, filed Sep. 17, 2014, "Depth Value Measurement Using Illumination by Pixels". As described there, a specular object is illuminated by area illumination from patterns formed on multiple LCD layers, which are in a known or calibrated spaced-apart configuration. Because the spacing of the layers is known or knowable, as is the location of a pixel in a layer, a ray connecting from a first pixel in one layer through a second pixel in another layer allows disambiguation of the surface-normal ambiguity, thereby permitting successful surface profiling of specular objects. The entirety of application Ser. No. 14/489,008 is incorporated herein by reference.

The disclosure herein recognizes that in a configuration such as that in application Ser. No. 14/489,008, there are a large number of light rays in the light field created by the multiple LCD panels that cannot reach the object being measured. By coding rays of the light field such that, for the most part, only useful rays are coded, rather than coding every single ray including rays that cannot reach the object being measured, the number of captured images can be reduced.

FIG. 1 provides further illustration of this point, showing a simplified "flatland" (i.e., 2D) example. Each LCD has a pixel resolution of 1024, so that the number of rays in the full light field is 1024×1024=1,048,576 light rays. Given a known bounding volume within which the object to be measured is positioned, the number of rays that can reach the bounding volume is 90,794, or a scant 8.66% of the full light field of 1,048,576 light rays. This phenomenon, where only a small percentage of all possible light rays are useful (such as only 8.66% of the light rays in this example), is herein referred to as "sparsity", and is one basis for light field coding in which mostly only useful rays are coded.

Thus, in one aspect described herein, the shape of a specular object is measured by illumination of the object by a light field generated by two or more spaced apart layers controllable to display multiple patterns that are predetermined relative to a bounding volume within which the object is positioned, wherein the patterns code a sparse subset of the multitude of light rays that can be generated by the layers to those that can actually reach the bounding volume.

Because the patterns code a sparse subset of the rays that can actually reach the bounding volume, rather than all rays including rays that fall outside the bounding volume, the shape of the specular object can be measured with fewer patterns as compared with conventional techniques that do not recognize and capitalize on the sparsity of useful light rays.

In another aspect described herein, measurement of the shape of a specular object positioned within a bounding volume at an inspection station includes illumination of the object with an illumination field generated by two or more spaced apart liquid crystal layers with largely overlapping fields of view, wherein each liquid crystal layer is controlled to display multiple binary patterns in synchronization with each other layer, capture of one or more images of the object under the illumination field, and recovery of the shape of the object using the captured one or more images. The multiple binary patterns are predetermined for the bounding volume such that relative to a large multitude of light rays in the illumination field, the multiple binary patterns code a sparse subset of the multitude of light rays that can reach the bounding volume.

A size for the bounding volume may be selected based on size of the object, and the predetermined multiple binary patterns may be selected from amongst multiple different pre-stored sets of multiple binary patterns, each different set corresponding to a different size of the bounding volume.

The liquid crystal layers may be sandwiched between a pair of mutually perpendicularly oriented polarization filters, one of which may be provided with or close to a backlight light source. A polarized light ray passing through a pixel of a liquid crystal layer undergoes a change of polarization based on the binary value of the binary pattern being displayed at the pixel, and a polarized light ray passing through two or more liquid crystal layers undergoes a change of polarization based on a logical XOR combination of the binary values of the binary patterns being displayed at the pixels of the liquid crystal layers through which the light ray passes.

The binary patterns are in general predetermined to assign a unique code to each light ray of the illumination field that can reach the bounding volume. Recovery of the shape of the object may include recovery of the unique codes from the captured one or more images and an identification of each corresponding light ray using the unique codes and based on the location of the bounding volume. For example, in some embodiments, recovery of the shape of the object may include a determination of a correspondence between an exit ray of the illumination field and an incoming ray to a camera in the captured one or more images, and the use of ray-ray intersection to determine position and normal of each such intersection point.

In another aspect described herein, multiple patterns are determined, such as for use in measuring shape of a specular object positioned within a bounding volume by illuminating the object with an illumination field generated by two or more spaced apart layers with largely overlapping fields of view, wherein each layer is controlled to display the multiple patterns. To determine the multiple patterns, starting from an initial pattern such as Gray code patterns, a multidimensional code vector is derived for each light ray passing through the two or more layers and reaching the bounding volume; and a projection transformation is derived that projects the multidimensional code vector for each light ray into a projected multidimensional code vector for the light ray whose dimensionality is smaller than that of the multidimensional code vector, without also annihilating a difference between any two of the multidimensional code vectors. There is iterated repetition of the derivation of multidimensional code vectors and the derivation of projection transformations, until a stopping condition is met, such as a situation where no further projection transformations can be derived without also annihilating a difference between any two of the multidimensional code vectors, so as to obtain the multiple patterns for the layers.

In another aspect described herein, multiple binary patterns are determined, such as for use in measuring shape of a specular object positioned within a bounding volume by illuminating the object with an illumination field generated by two or more spaced apart liquid crystal layers with largely overlapping fields of view, wherein each liquid crystal layer is controlled to display the multiple binary patterns. To determine the multiple binary patterns, multiple starting binary patterns are chosen for the liquid crystal layers for which patterns have not yet been determined; a multidimensional binary code vector is derived in a multidimensional binary code vector space for each polarized light ray passing through the two or more liquid crystal layers and reaching the bounding volume using a logical XOR combination of values; a multidimensional binary code vector for projection is found in the multidimensional binary code vector space; a projection transformation is determined by the multidimensional binary code vector for projection; and the projection transformation is applied to the multiple starting binary patterns to obtain multiple binary patterns for the liquid crystal layers.

The projection transformation may be a transformation that reduces the dimension of the multidimensional binary code vector space by one, wherein the dimension of the multidimensional binary code vector space corresponds to the number of captured images.

There may be iterated repetition of the derivation of a multidimensional binary code vector, the finding of a multidimensional binary code vector for projection, the determination of a projection transformation, and the application of the projection transformation, after replacing the multiple starting binary patterns with the obtained multiple optimized binary patterns for the liquid crystal layers to obtain multiple increasingly optimized binary patterns for the liquid crystal layers.

The multidimensional binary code vector for projection may be found based on maximizing a code sparsity that measures a low density of the multidimensional binary code vectors for the light rays after the projection.

The multiple starting binary patterns may be based on a binary reflected Gray code.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 7(A) and 7(B) illustrate forward LUTs (look-up tables) for obtaining a binary-valued code vector for a given one-dimensional ray index, in vertical and horizontal patterns, respectively.

FIGS. 7(C) and 7(D) illustrate reverse LUTs for obtaining pixel locations in each of m layers of an m-layered LCD illumination source given a decoded decimal value obtained from captured images of specular reflections, in vertical and horizontal patterns, respectively.

DETAILED DESCRIPTION

<Measuring Shape of Specular Objects>

Figure 1:
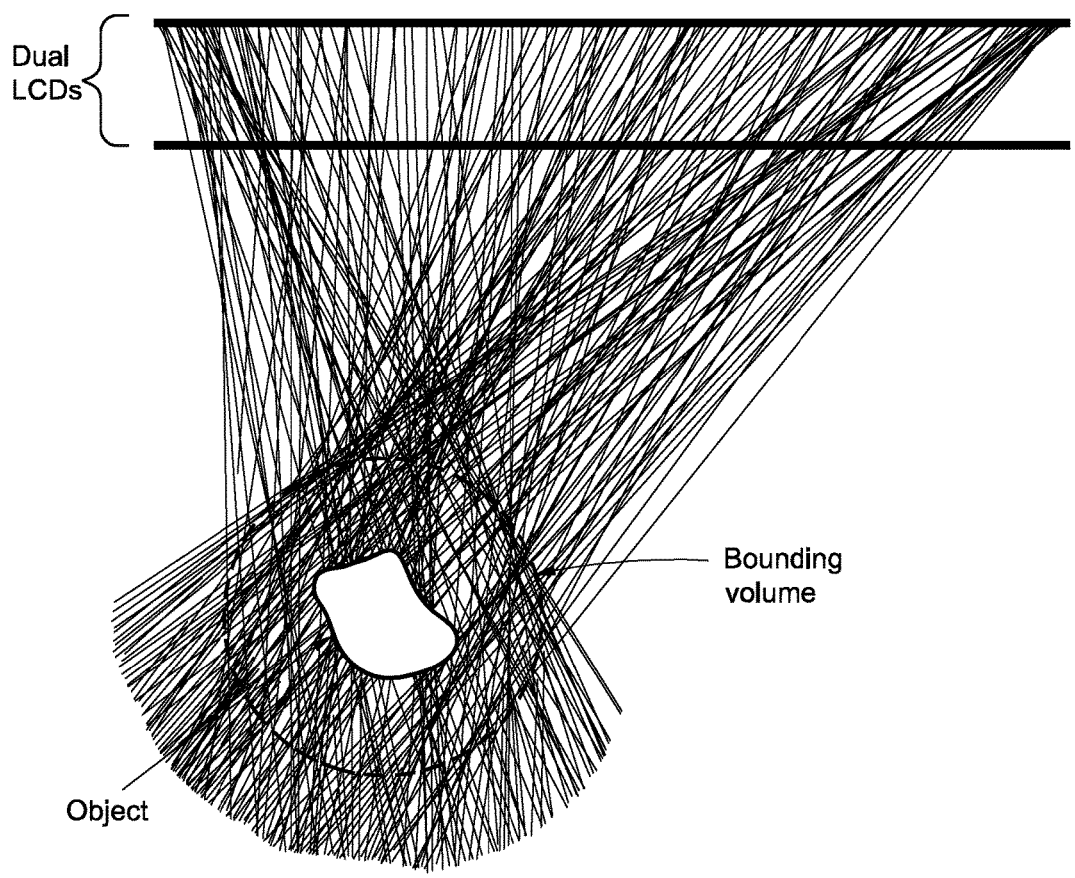
FIG. 1 is a view for explaining sparsity of useful light rays that impact a bounding volume, relative to the multiplicity of all light rays generated by area illumination from two or more spaced-apart LCD layers.
Figure 2:
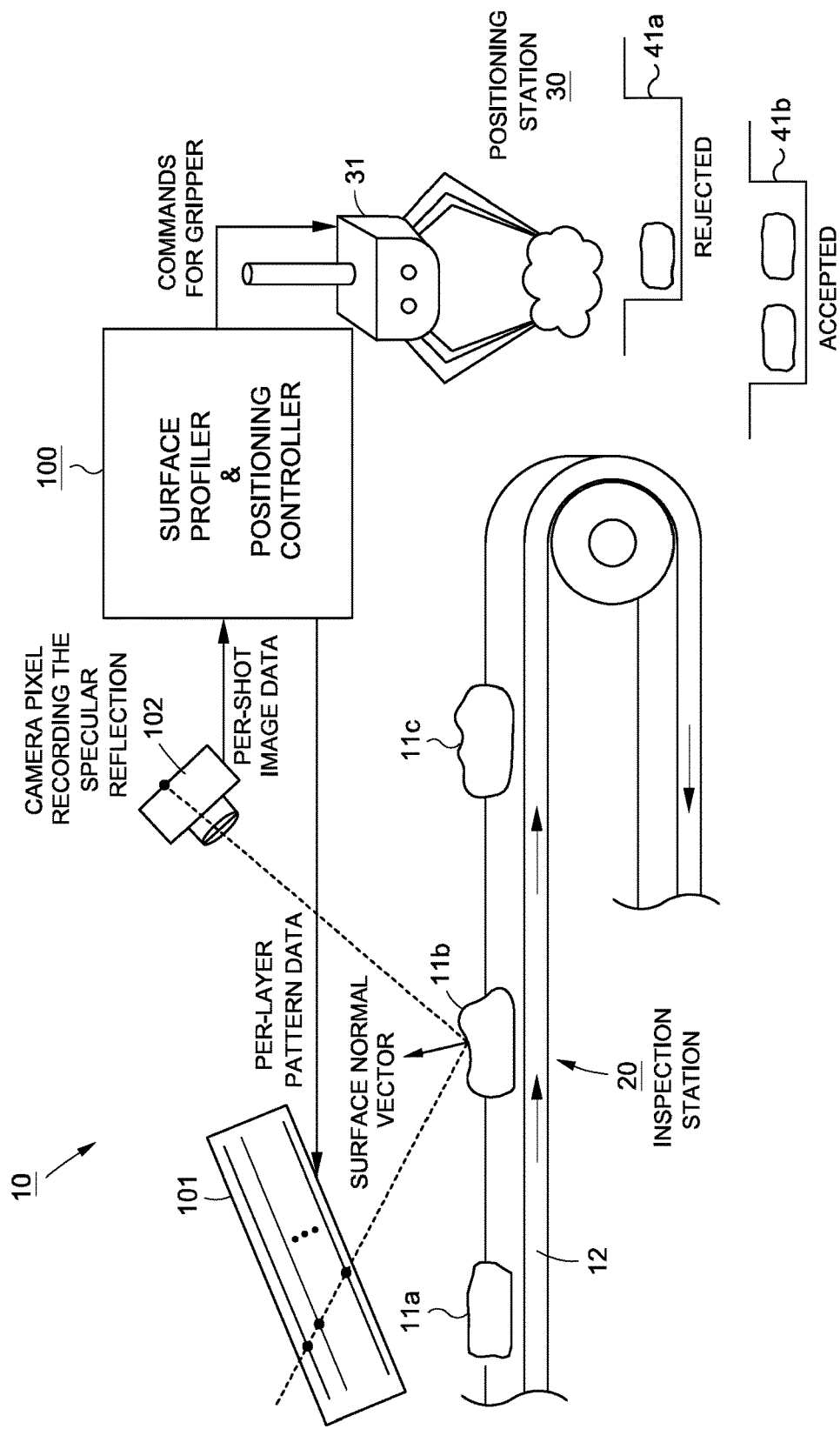
FIG. 2 shows one example embodiment of a system for measuring the shape of specular objects, in the form of a robotic inspection and positioning system

FIG. 2 is a view showing one example embodiment of a system for measuring the shape of specular objects according to the description herein, in the form of a robotic inspection system 10 in which specular objects are inspected such as for manufacturing defects or for acceptability in recycling, and are repositioned based on the outcome of inspection. In particular, based on the shape as measured by system 10, defects may be identified in manufactured objects, or the object can be evaluated for acceptability for re-use in recycled product. In addition, or in an alternative arrangement, once the shape of the object is measured, the measurement allows for the gripping and placement of the object more precisely and/or more delicately, for further processing in accordance with automated object handling.

While FIG. 2 depicts a robotic inspection environment, it should be understood that this is simply an example environment in which the disclosure may be practiced, and that other environments or embodiments are of course possible. For example, shape measurement can also be used in the context of manufacturing, robotics, machine vision, quality control, image retrieval, shape modelling and scene reconstruction, security and so forth, among many others.

As shown in FIG. 2, specular objects 11a, 11b, 11c, etc. are conveyed on a conveyor mechanism 12 to an inspection station 20, where the shape of each object is measured, and thence to a positioning station 30, where the objects are gripped by a controllably movable gripper 31 and positioned in accordance with automated object handling. As shown in FIG. 2, the objects can have arbitrary shapes including flat or non-flat shapes. It should be understood that conveyor mechanism 12 is simply an example of an arrangement that includes an inspection station. In addition, although FIG. 2 depicts three objects, any number of objects may appear on conveyor mechanism 12 at a time.

Inspection station 20 is illuminated by illumination source 101 which generates an area illumination field for illumination of a bounding volume at inspection station 20. As explained in greater detail below, illumination source 101 includes two or more spaced apart layers positioned relative to each other with largely overlapping fields of view, wherein each layer is controllable to display multiple patterns. As further explained below, in this embodiment, each layer includes a liquid crystal layer, such as twisted nematic crystal layer, positioned between a pair of transparent and pixel-controllable electrode substrates, which rotates the plane of polarization of light passing therethrough in accordance with the electric field applied across the layer at each pixel. All of the multiple layers are sandwiched between a pair of mutually perpendicularly oriented polarization filters and a backlight is positioned for illumination through the assembly.

In this regard, the description of the embodiment herein sometimes refers to each layer as a liquid crystal layer, and sometimes refers to each layer as an LCD layer even though each layer in this embodiment does not include its own backlight, and even though each layer does not include its own pair of polarization filters. Those of ordinary skill will understand the context.

Referring again to FIG. 2, an image capture device 102 is positioned to capture an image of the object at inspection station 20 as illuminated by area illumination from illumination source 101. More precisely, because the objects are specular objects, capture device 102 captures a distorted reflection of the patterns displayed by illumination source 101, with the reflection being created by the glossy, mirror-like surface of the object and being distorted by the surface profile of the object. In this embodiment, image capture device 102 is a digital still camera. In other embodiments, particularly in high-speed environments, image capture device 102 may be a digital video camera. In still further embodiments, multiple image capture devices may be positioned in a three-dimensional configuration around the inspection station. In such a configuration, more of the surface of the object is visible as compared to a single camera configuration, thereby permitting measurement and profiling of a larger area on the surface of the object.

In general, and as explained in greater detail below, multiple patterns are displayed on the layers of illumination source 101, based on per-layer binary coded pattern data issued from surface profiler 100. A corresponding number of images are captured by image capture device 102, and these images are stored by surface profiler 100. The identity of a ray exiting the illumination source, reflected by the object, and captured in an image, is obtained by decoding a binary code that is unique for the ray. Thereafter, the direction and position of the ray is determined by calculating a regression line through the corresponding pixels of the layers, based on knowledge or calibration of the spaced-apart relationship between the layers. Then, having determined the direction and position of the exit ray, and given the incoming ray to image capture device 102 in the captured images, ray-ray intersection is used to determine position, and a calculation of a half-way vector is used to determine the normal of each such intersection point, thereby permitting measurement and reconstruction of the surface profile and shape of the object.

Based on the measurement of the shape of the object, positioning controller 100 issues commands to gripper 31 to grip the object and to reposition it. In this embodiment, gripping of the object is informed by the measured shape of the object, and thus permits gripping of the object with increased accuracy and delicacy. Also in this embodiment, repositioning of the object is informed by the measured shape of the object, such as an identification of defects in manufactured objects or an evaluation of acceptability for recycling of the object, and the object is repositioned accordingly. In this embodiment, the object is sorted into one of plural bins 41a and 41b, for rejected objects and acceptable objects, respectively.

It should be also understood that surface profiler and positioning controller 100 may be included in a computer, the computer generally comprising a programmable general purpose computer having an operating system, such as Microsoft® Windows® or Apple® Mac OS® or LINUX, and which is programmed as described below so as to perform particular functions and, in effect, become a special purpose computer when performing these functions.

Figure 3:
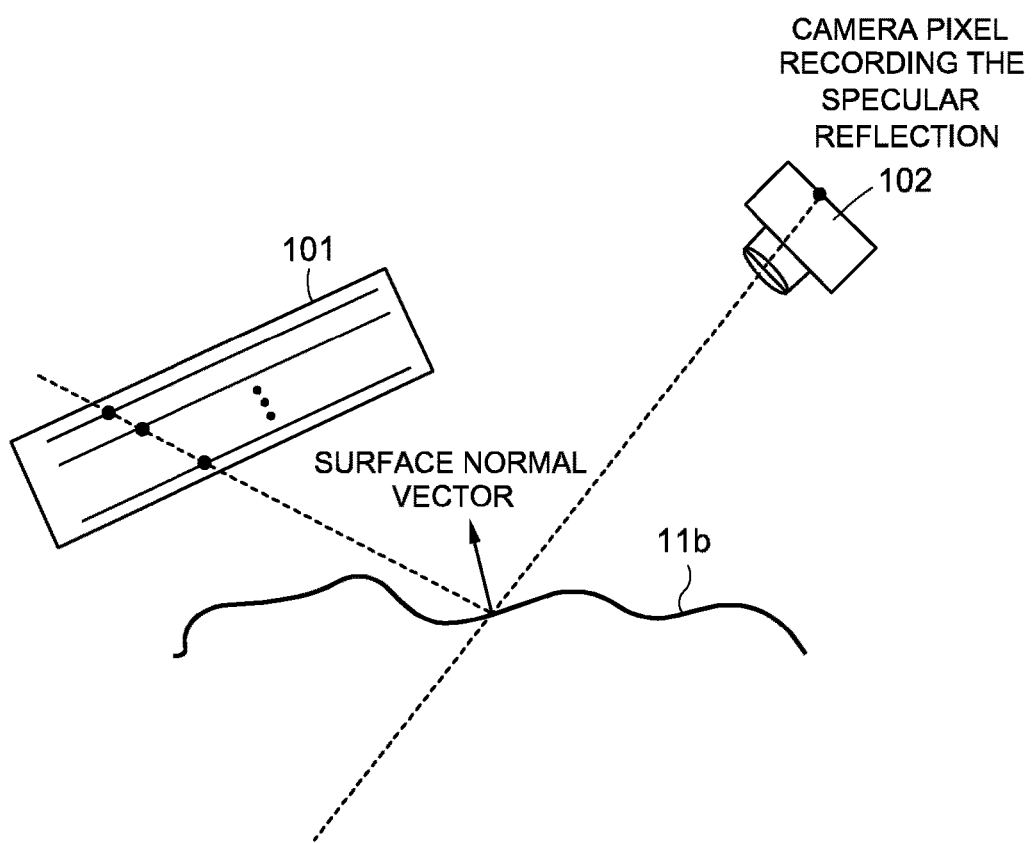
FIG. 3 is a more detailed view of an object at the inspection station of FIG. 2.

FIG. 3 is a more detailed view of an object on conveyor mechanism 12 at inspection station 20. In this figure, area illumination from the multiple layers of illumination source 101 is directed at the surface of specular object 11b, which reflects the illumination light toward capture device 102. Specular object 11b reflects each exit light ray from illumination source 101 at an angle that depends on its surface normal. Specifically, the surface of specular object 11b reflects each exit light ray such that its angle relative to the local surface normal is equal to the angle of the reflected light ray. Some of the reflected light rays will therefore not be captured by capture device 102, in dependence on the surface profile of the object, as expected. For those others of the reflected light rays that are reflected toward capture device 102, these light rays are captured as incoming light rays. It is the different pattern of captured incoming light rays, coupled with the illumination pattern, that permits decoding of the pixels on the LCD layers that caused the specular reflection.

As shown in FIG. 3, this example embodiment includes a single multi-layer LCD illumination source and a single capture device. In general, and in other embodiments, multiple illumination sources and capture devices may provide for additional visibility of the surface of the object, resulting in a more complete profiling of all or nearly all of the surface of the object.

Figure 4:
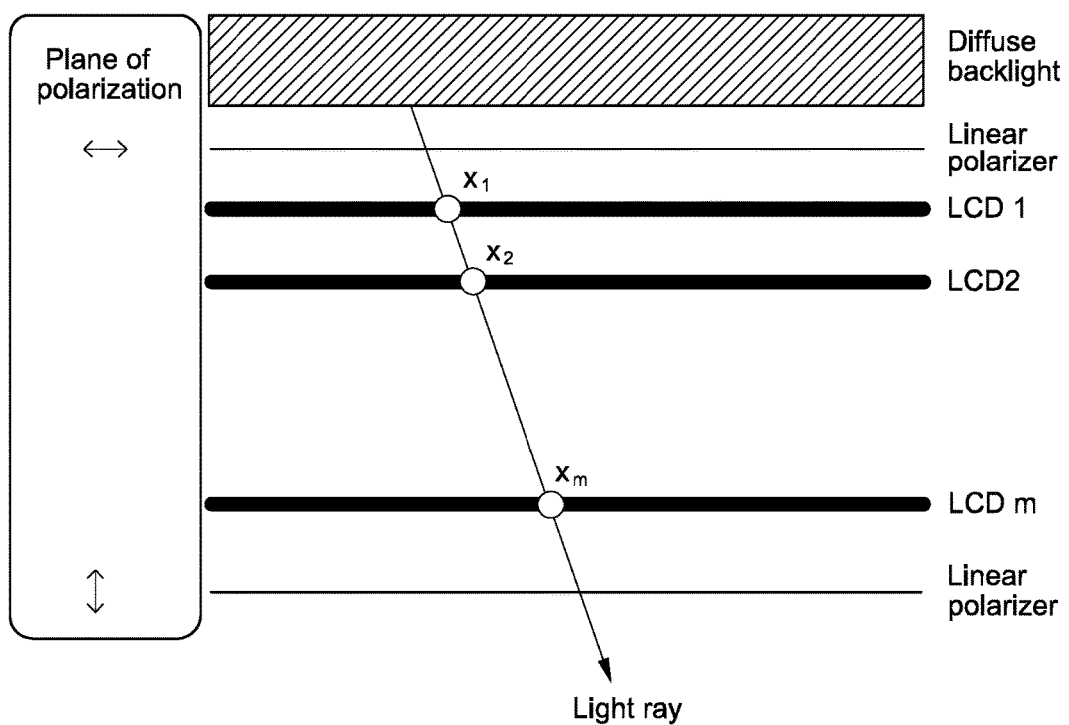
FIG. 4 is a cross-sectional diagrammatic view of multiple LCD layers in the illumination source.

FIG. 4 is a cross-sectional diagrammatic view of multiple LCD layers in illumination source 101.

As shown in FIG. 4, and proceeding in the direction of an exit light ray, illumination source 101 includes a diffuse backlight positioned for illumination through the illumination source of patterns displayed on each of the LCD layers. A linear polarizer is positioned in front of the diffuse backlight, and is one of a pair of linear polarizers that are perpendicularly oriented relative to each other and which sandwich all of the multiple LCD layers therebetween. Multiple layers of LCDs are then arranged in front of the linear polarizer, such as LCD1, LCD2, . . . , LCDm and so forth. The other of the pair of linear polarizers is arranged in front of the LCD layers. While this embodiment uses linear polarizers, it should be understood that other types of polarizers may be used, such as a pair of circularly polarizing filters.

Each LCD layer includes a liquid crystal layer, such as twisted nematic crystal layer, positioned between a pair of transparent and pixel-controllable electrode substrates. Each layer thus rotates the plane of polarization of light passing therethrough in accordance with the electric field applied across the layer at each pixel. It is stated again here that the description of the embodiments herein sometimes refers to each layer as a liquid crystal layer, and sometimes refers to each layer as an LCD layer even though each layer in this embodiment does not include its own backlight, and even though each layer does not include its own pair of polarization filters. Those of ordinary skill will understand the context.

A light ray from the diffuse backlight unit is polarized by the first linear polarizing filter. Then its polarization state is subject to modification every time it passes through an LCD layer. The visibility of the light ray when it emerges from the multiple LCD system depends on its polarization state after going through all the LCD layers and the orientation of the linear polarizing filter at the end. As a result of the polarization effects of each layer, combined with the effects of the pair of polarization filters, a light ray will exit from the illumination source only if there is an odd number of pixels in its path that are turned on, such as if exactly one pixel is turned on. Stated another way, if there are two pixels (or an even number of pixels) in the path of the exit ray, the polarization effects of the two pixels cancel each other, such that if there is an even number of pixels turned on, the ray does not exit from the illumination source. As explained below, this effect is referred to herein as binary addition or XOR addition.

Under control of surface profiler and positioning controller 100, objects are positioned at the inspection station, multiple binary patterns are sequentially displayed by the LCD layers of the illumination source 101, corresponding images are captured by capture device 102, and the captured images are analyzed to determine the shape of the object. Based on the shape of the object, surface profiler and positioning controller 100 causes the object to be grasped and re-positioned appropriately, such as to bins 41*a* and 41*b*.

Figure 5:
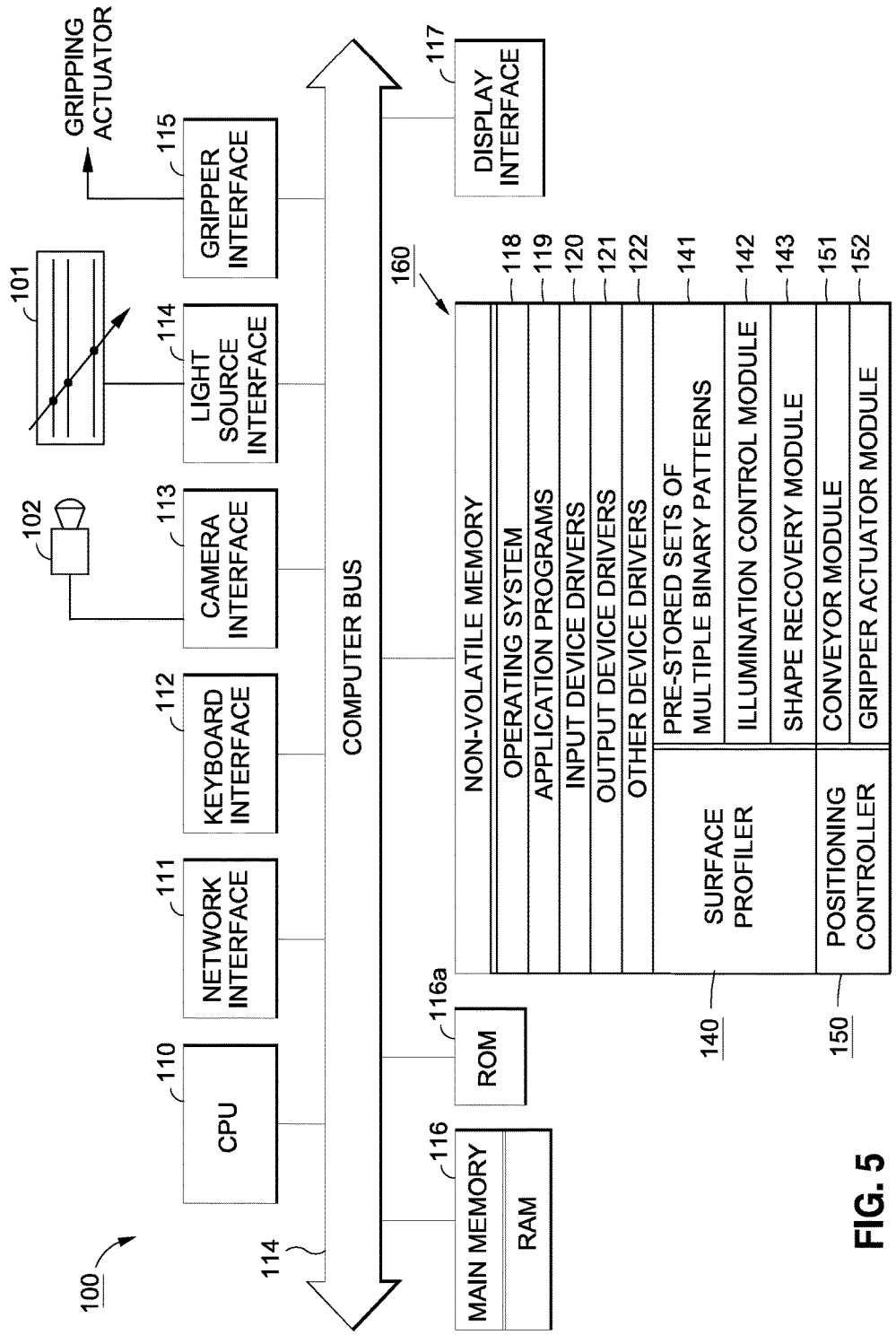
FIG. 5 is a block diagram showing the architecture of the surface profiler and positioning controller.

FIG. 5 is a view for explaining the architecture of surface profiler and positioning controller 100.

As shown in FIG. 5, surface profiler and positioning controller 100 includes central processing unit (CPU) 110 which interfaces with computer bus 114. Also interfacing with computer bus 114 are network interface 111, keyboard interface 112, camera interface 113, random access memory (RAM) 116 for use as a main run-time transient memory, read only memory (ROM) 116*a*, display interface 117 for a display screen or other output, and non-volatile memory 160 (e.g., a hard disk or other nonvolatile and non-transitory storage medium).

RAM 116 interfaces with computer bus 114 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 160, or another storage device into a region of RAM 116. CPU 110 can then execute the stored process steps from RAM 116 in order to execute the loaded computer-executable process steps. Data, also, can be stored in RAM 116 so that the data can be accessed by CPU 110 during the execution of the computer-executable software programs, to the extent that such software programs have a need to access and/or modify the data.

As also shown in FIG. 5, non-volatile memory 160 contains computer-executable process steps for operating system 118, and application programs 119, such as graphic image management programs. Non-volatile memory 160 also contains computer-executable process steps for device drivers for software interface to devices, such as input device drivers 120, output device drivers 121, and other device drivers 122.

Non-volatile memory 160 also stores a surface profiler module 140 and a positioning controller module 150. The surface profiler module 140 and the positioning controller 150 comprise computer-executable process steps for measuring the shape of a specular object, and for repositioning the object based on its measured shape.

As shown in FIG. 5, surface profiler module 140 generally comprises pre-stored sets 141 each containing multiple binary patterns for display by the LCD layers of illumination source 101. The determination of the these sets is described in detail below, and once determined, the sets of binary patterns are pre-stored for use during measurement of object shape. In addition, surface profiler module 140 may also comprise pre-stored look-up tables (LUTs) including pre-stored forward LUTs for obtaining a binary-valued code vector for a given one-dimensional ray index, in vertical and horizontal patterns, respectively; and pre-stored reverse LUTs for obtaining pixel locations in each of m layers of an m-layered LCD illumination source given a decoded decimal value obtained from captured images of specular reflections, in vertical and horizontal patterns, respectively.

Surface profiler module 140 also generally comprises an illumination control module 142 for control of the display of binary patterns by the LCD layers of illumination source 101, and a shape recovery module 142 for controlling capture by capture device 102 of corresponding images of the object under the illumination field generated by illumination source 101, and for analyzing the images so as to recover the shape of the object Positioning controller module 150 generally comprises conveyor module 151 for control of conveyor 12 to position objects at inspection station 20, and gripper actuator module 152 for control of gripper 31 so as to reposition the object based on its measured shape.

The computer-executable process steps for these modules may be configured as part of operating system 118, as part of an output device driver in output device drivers 121, or as a stand-alone application program. These modules may also be configured as a plug-in or dynamic link library (DLL) to the operating system, device driver or application program. It can be appreciated that the present disclosure is not limited to these embodiments and that the disclosed modules may be used in other environments.

Figure 6:
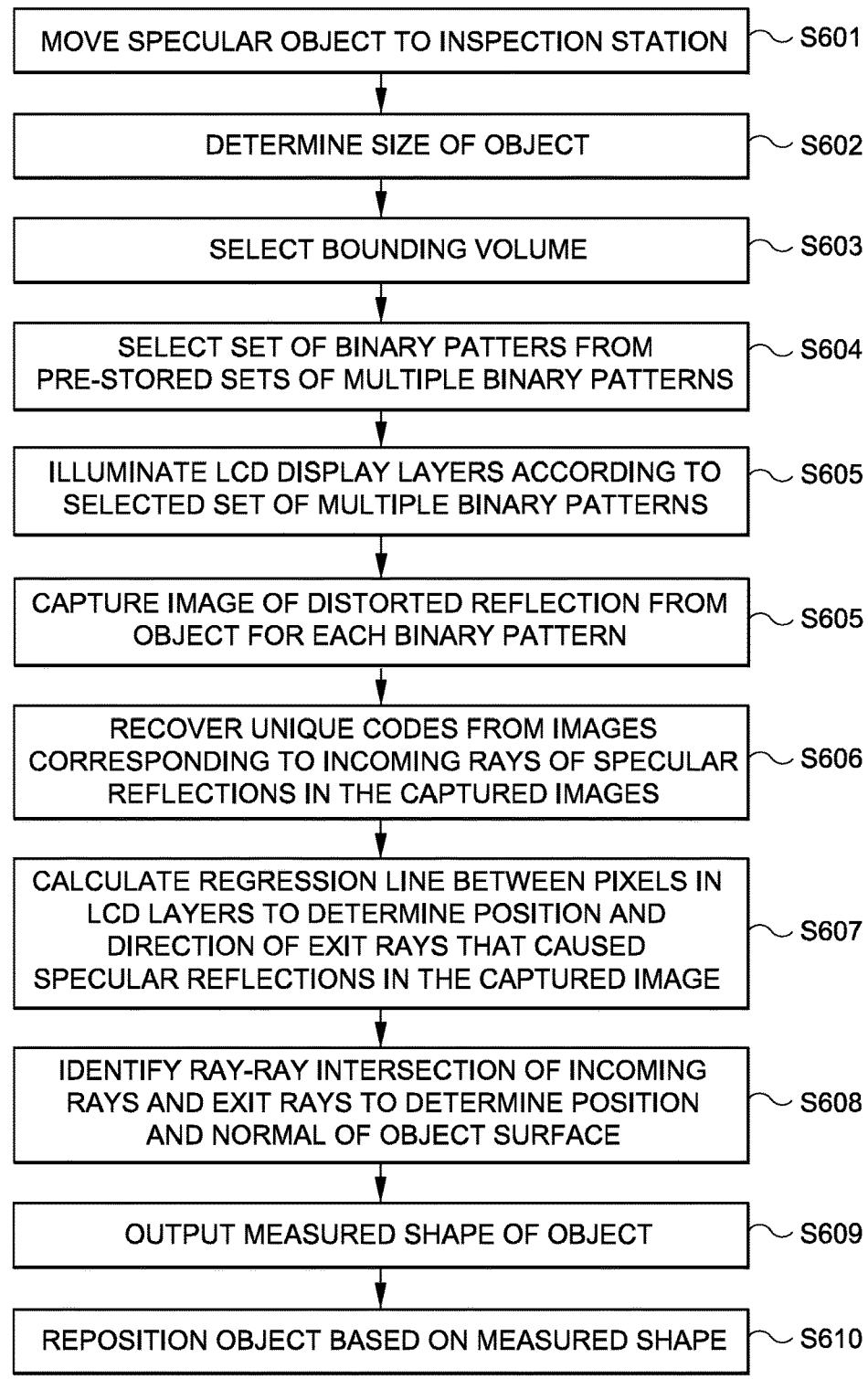
FIG. 6 is a flow diagram for explaining operation of the system for measuring the shape of specular objects.

FIG. 6 is a flow diagram for explaining operation of the system 10 for measuring the shape of specular objects.

In step S601, a specular object is moved by conveyor 12 under control of conveyor module 151 to inspection station 20. Step S602 determines the size of the object. The size of the object may be input manually, such as in situations where all objects are sized similarly, or it may be determined automatically such as using proximity detectors.

In step S603, based on the size of the object, a bounding volume is selected. The bounding volume is selected so as to ensure that the visible surface of the object is confined within its interior. As explained below, the bounding volume may be selected from various pre-set sizes such as sizes ranging from 1.50 inches in radius to 0.25 inches in radius.

Based on the selected size of the bounding volume, step S604 selects a corresponding set of multiple binary patterns from amongst the pre-stored sets of multiple binary patterns stored at 141 in non-volatile memory 160. The selected set of multiple binary patterns is tailored for the size of the selected bounding volume.

Step S605 illuminates the LCD layers of illumination source 101 according to the selected set of multiple binary patterns. The patterns are displayed sequentially, and for each display of a pattern, step S606 captures an image of the distorted reflection from the surface of the object for each displayed binary pattern.

Steps S607 through S609 work to measure and thereby recover the shape of the object by analysis of the captured images. More specifically, in step S607, unique codes are recovered from images corresponding to incoming rays of specular reflections in the captured images. Step S608 calculates a regression line between pixels in the LCD layers that caused the specular reflections in the captured images, based on the geometric configuration such as spacing of the LCD layers, to determine position and direction of exit rays that caused specular reflections. Step S609 uses ray-ray intersection of incoming rays to the image capture device and exit rays from the illumination source to determine the position of the object surface, and calculation of a half-way vector to determine the normal of the object surface. Steps S607 through S609 are explained in greater detail below.

In step S610, the measured shape of the object is outputted and stored as appropriate, and in step S611 the object is repositioned based on the measured shape. In particular, based on the shape as measured by system 10, defects may be identified in manufactured objects, or the object can be evaluated for acceptability for re-use in recycled product. In addition, or in an alternative arrangement, once the shape of the object is measured, the measurement allows for the gripping and placement of the object more precisely and/or more delicately, for further processing in accordance with automated object handling.

More detail is now provided on the analysis of steps S607 through S609, whereby the captured images are analyzed so as to measure and thereby recover the shape of the object.

In preparation for analysis, the images may be thresholded. For example, the images may be thresholded by a value that is the same for all pixels and is learned from a training phase (or calibration phase) where a number of specular objects with known shape (for example, flat shape) are captured by the system and specular pixels in the captured images manually identified. A thresholding value may then be learned by a method of supervised learning. Alternatively, there may be pixel-dependent thresholding. In one embodiment that provides an algorithm robust to stray light and other potential external lighting, the pixel-dependent thresholding is provided by capturing inverted images of the same binary patterns. This is different than simply inverting each binary pattern on each LCD layer, and will be explained in more detail below.

In addition, for some embodiments, to help with the post-processing of the captured images, such as binarization and/or thresholding of the captured images, it is common to capture also images of the "inverted patterns". For a dual LCD system, this can be done by inverting the binary pattern on one of the LCD layers, based on the law $\sim(x \oplus y) = x \oplus (\sim y) = (\sim x) \oplus y$. The choice of LCD layer to invert the pattern can be different for each shot. Formally, if $X \in F_2^{2N \times M}$ is the optimized binary code matrix for the LCD layers, an inversion selection vector may be arbitrarily chosen for each shot, $s \in F_2^M$ and a complementary binary code matrix $X_s$ may be defined by $$X_s(i, j) = \begin{cases} X(i, j) + 1 & \text{if } s(j) \cdot N + 1 \leq i \leq s(j) \cdot N + N \\ X(i, j) & \text{otherwise} \end{cases} \quad \text{eq. 1}$$

To the camera, captured patterns when displaying Xs will be inverted compared to the patterns when displaying X.

The resulting thresholded images may thereafter be combined to obtain a multidimensional binary code vector for each pixel in the captured images that receives a specular reflection. As will be explained below, each light ray that reaches the bounding volume is assigned a unique multidimensional binary code vector. Recovery of the code vector from the captured images allows identification of the ray. In one embodiment, the code vector for a ray consists of a "vertical" part and a "horizontal" part, wherein the vertical part can be recovered from imaging a set of vertical binary patterns while the horizontal part can be recovered from imaging a set of horizontal binary patterns. When both the vertical and horizontal parts are recovered, the identity of the ray is obtained. From the identity of the ray, the pixels on the LCD layers through which the ray passes through can be determined, for example, by a reverse table lookup.

In this regard, illustrations of example forward and reverse LUTs (look-up tables) are shown in FIGS. 7(A), 7(B), 7(C) and 7(D). FIGS. 7(A) and 7(B) illustrate forward LUTs for obtaining a binary-valued code vector for a given one-dimensional ray index, in vertical and horizontal patterns, respectively. The binary-valued code vectors are designated as $R_i^{(v)}$ and $R_i^{(h)}$, respectively, for the vertical and horizontal directions. A binary representation is sometimes convenient since, for a given pixel location in the captured images, each binary digit corresponds to the presence or absence of a specular reflection in a respective one of the images. Naturally, any given binary value (base-2) has an equivalent decimal value (base-10).

FIGS. 7(C) and 7(D) illustrate reverse LUTs for obtaining pixel locations in each of m layers of an m-layered LCD illumination source given a decoded decimal code value obtained from captured images of specular reflections, in vertical and horizontal patterns, respectively. The decimal code values are designated as $$[R_i^{(v)}]_{10} \text{ and } [R_i^{(h)}]_{10},$$

respectively, for the vertical and horizontal directions, where these values are calculated as follows:

$$[v]_{10} = [v_1, \ldots, v_M]_{10} = \sum_{k=1}^{M} v_k \cdot 2^{M-k} \quad \text{eq. 2}$$

where M is the number of shots, or the number of captured images. In this equation, each $v_i$ in $[v_1, \ldots, v_M]$ represents a binary value indicating the presence or absence of a specular reflection at a given pixel across the captured images, for example, according to the thresholding in the description above, and $[v_1, \ldots, v_M]_{10}$ represents the decimal (base-10) equivalent of this binary number. The reverse LUTs of FIGS. 7(C) and 7(D) thus allow convenient lookup of the location of each pixel in each LCD layer of the illumination source that caused the specular reflection.

The forward and reverse LUTs shown in FIGS. 7(A), 7(B), 7(C) and 7(D), may be pre-stored in memory 160 of FIG. 5, for use by surface profiler module 140, as mentioned above.

In summary, the process of reverse table lookup provides the pixel locations of corresponding pixels on the LCD layers.

In particular, for each camera pixel that receives a specular reflection, m pixel locations (corresponding to m layers) are obtained, by which a regression line is fit for the incoming illumination direction. If m=2, this is not ordinarily called a regression line and is simply a line connecting two points. In that regard, ordinarily, at least two points are needed to fit a regression line. If m>2, there may be a benefit from subpixel superresolution and subpixel accuracy. In one embodiment, a regression line is fitted to the m points by minimizing the sum of squared distances of the points from the line.

Thus, in an example according to this embodiment, the image is analyzed to determine the location of a pixel in each of the multiple LCD layers that is associated with the specular reflection, and a regression line on the pixel locations determines the direction of incoming illumination for the specular reflection.

Then, from the incoming illumination direction and the viewing direction of the camera, it is possible to obtain the depth value of the point on the surface of the object, by triangulation of the direction of incoming illumination and a viewing direction for the specular reflection captured in the image.

In that regard, the viewing direction is not necessarily fixed for a given camera position, but is different for each specular reflection. More specifically, each camera pixel determines a viewing direction and therefore the viewing direction depends on the camera pixel for a particular specular reflection. Thus, for each point on the surface of the object, the viewing direction changes. For example, even in a case where the capturing camera is fixed, the viewing direction of each camera-pixel is not.

Generally, if the incoming illumination direction is represented parametrically by x=p+tu where p is a 3D point, u is a unit vector and t is a free parameter, and similarly the viewing direction is represented parametrically by x=q+sv where q is a 3D point, v is a unit vector and s is another free parameter, then the surface point can be estimated by the method of triangulation as $$\frac{1}{2}(p + q + t_0 u + s_0 v),$$

where w=q−p, $$t_0 = \frac{u \cdot w - (u \cdot v)(v \cdot w)}{1 - (u \cdot v)^2}, \text{ and } s_0 = \frac{-v \cdot w + (u \cdot v)(u \cdot w)}{1 - (u \cdot v)^2}.$$

The estimated point is the 3D point that is closest to both lines corresponding to the two directions. The depth value of this 3D point is then taken as the depth value of the point on the surface of the object.

Depth value can also be determined by other methods besides triangulation. For example, in one example embodiment, a surface normal vector is estimated for each of a plurality of points on the surface from the direction of incoming illumination for the specular reflection at each point and a viewing direction for the specular reflection captured in the image, and the depth value is determined by determining a surface profile function whose normal derivatives best fit the estimated surface normal vectors. In one example, the surface normal vector is estimated as a half-way vector between the direction of incoming illumination and the viewing direction. In that regard, if u denotes a unit vector pointing away from the surface along the direction of the incoming illumination, and v denotes a unit vector pointing away from the surface along the viewing direction, then the unit normal vector n of the surface is given by $$n = \frac{u + v}{\|u + v\|}.$$

<Determining Multiple Binary Patterns>

A description will now be provided for the general formulation of coding for a multiple LCD system.

Consider again the multi-layer LCD system with m layers such as that depicted in FIG. 4.

When m=1, the FIG. 4 arrangement may notionally be considered as equivalent to the design of a typical LCD display. A light ray from the diffuse backlight unit is polarized by the first linear polarizing filter. Then its polarization state is subject to modification every time it passes through an LCD layer. The visibility of the light ray when it emerges from the multiple LCD system depends on its polarization state after going through all the LCD layers and the orientation of the linear polarizing filter at the end. In other embodiments, circularly polarizing filters can be used.

Here, because interest is focused on binary patterns, each pixel of an LCD layer can be modeled by a Boolean variable.

In FIG. 4, these are represented for the pixels depicted by $x_1, \ldots, x_m$. The physical interpretation of the Boolean variable is as follows. A Boolean value of 0 corresponds to an untwisting action of the LCD nematic crystal molecules so that the polarization of light is not changed. This pixel state is achieved by applying a high voltage, which in turn typically maps to a user input 8-bit digital value of 0. A Boolean value of 1 corresponds to a twisting action of the LCD molecules so that the polarization of light is rotated 90 degrees. This pixel state is achieved by applying a low voltage, which in turn typically maps to a user input 8-bit digital value of 255.

The above description may conveniently be summarized by an equation that describes the overall action of the LCDs. If y is a Boolean variable representing the visibility state of the light ray depicted in the figure, and the linear polarizing filters are oriented at 90 degrees to each other (as shown in FIG. 4), then $$y = x_1 \oplus x_2 \oplus \ldots \oplus x_m \qquad \text{eq. 3}$$

where $\oplus$ is the XOR (exclusive OR) operator, otherwise known as binary addition.

Now consider a set of light rays that pass through all LCD layers. More accurately, these light rays are actually "light ray bundles" if it is acknowledged that pixels have finite size and a "ray" connecting two pixels is really a bundle of rays. Each such ray is uniquely identified by where it intersects the LCD layers. To simplify the theoretical discussion, consider the "flatland" case for now and assume that each LCD layer has the same pixel resolution N. Let the number of rays considered be r. The i-th ray is uniquely identified by pixel coordinates on the LCD layers, denoted by $(j_{i1}, \ldots, j_{im})$. A "code transfer matrix" A, which is a sparse r×Nm matrix, is defined as:

$$A(i,(k-1)N+j_{ik})=1 \text{ for } i=1,2,\ldots,r; k=1, 2,\ldots,m; \text{zero everywhere else} \qquad \text{eq. 4}$$

If binary patterns are displayed on the m LCD layers, and they are respectively represented by binary vectors $x_1, \ldots, x_m \in F_2^N$ (where $F_2$ denotes the finite field with 2 elements 0 and 1), then these binary patterns are multiplexed by the XOR operation and the resulting codes on the rays are given by code vector $r \in F_2^r$ given by the following equation:

$$r = A \begin{pmatrix} x_1 \\ \vdots \\ x_m \end{pmatrix} \qquad \text{eq. 5}$$

Notionally, the code transfer matrix A may be said to transfer the codes on the LCD layers to codes on the rays. It can be understood that if a specular object is placed in the light field created by the multiple LCD system, and if a camera is placed in a position that allows receiving some of the reflected rays each of which is associated with a code, then the identity of the code received at each camera pixel provides important information about the shape of the object.

The following remarks (1) through (3) provide additional explanation and alternate embodiments for the nature of the code transfer matrix A and the nature of the LCD layers in the illumination source.

Remark (1): In general, M sets of binary patterns are displayed on the LCD layers, resulting in M sets of codes on the rays, which are captured by the camera in M shots. This can be summarized in one simple matrix equation:

$$R = AX \qquad \text{eq. 6}$$

where X is an Nm×M binary matrix for the LCD layers, R is an r×M binary matrix for the light field, and A is the code transfer matrix from above.

Although the above formulation assumes that each LCD layer has the same size and pixel resolution, the formulation can be easily generalized to multiple LCD layers with different pixel resolutions. If $N_1, \ldots, N_m$ are the pixel resolutions of the layers respectively, then in this case the Code Transfer Matrix A, which is still a sparse matrix whose size is now $r \times \Sigma_{k=1}^m N_k$, is defined by $$A(i, \Sigma_{l=1}^{k-1} N_l + j_{ik}) = 1 \text{ for } i=1,2,\ldots,r; k=1, 2,\ldots,m; \text{zero everywhere else} \qquad \text{eq. 7}$$

Figure 8:
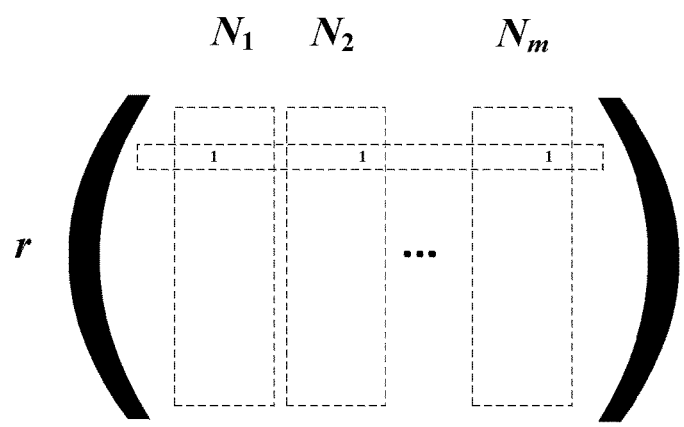
FIG. 8 shows one possible visualization of a code transfer matrix by which codes on the LCD layers are transferred to codes on exit light rays, in arrangements where the LCD layers are not necessarily the same size or do not have the same pixel resolution.

FIG. 8 shows one possible visualization of this matrix. As shown in FIG. 8, the matrix can be partitioned into m blocks corresponding to the m LCD layers $N_1, \ldots, N_m$. For each row of the matrix, exactly one "1" appears in each block.

Those of ordinary skill will understand that the rank of code transfer matrix A is given by:

$$\text{rank}(A) \leq \min(r, \Sigma_{k=1}^m N_k - m + 1) \qquad \text{eq. 8}$$

By way of explanation, if the undirected graph associated with the light field between any two LCD layers (where a node of the graph corresponds to a pixel and an edge corresponds to a ray) is connected, i.e., has only one connected component, then $\text{rank}(A) = \min(r, \Sigma_{k=1}^m N_k - m + 1)$, as shown above.

Remark (2): The LCD layers were described as if they were one-dimensional, but the formulation can be easily extended to the 2D case by "linearizing" the 2D array of pixels for each LCD layer into a 1D array of pixels by, for example, packing pixel columns into a 1D array. Note however that this viewpoint would lead to very large matrices with millions of rows and columns, with corresponding computational challenges.

Remark (3): Another more computationally feasible viewpoint to apply the "flatland" formulation to 3D is as follows. For simplicity, consider the case where the number of LCD layers is m=2. Assume that there is a need to determine a ray connecting pixel $(\alpha_1, \beta_1)$ on LCD 1 to pixel $(\alpha_2, \beta_2)$ on LCD 2. A set of vertical binary patterns allows recovery of a code that is associated with a "ray" connecting "pixel" $\alpha 1$ to "pixel" $\alpha 2$. Note that there may be many rays that connect pixels with x-coordinate $\alpha 1$ to pixels with x-coordinate $\alpha 2$. Another set of horizontal binary patterns allows recovery of a code that is associated with a "ray" connecting "pixel" $\beta 1$ to "pixel" $\beta 2$, and again there may be many rays that connect pixels with y-coordinate $\beta 1$ to pixels with y-coordinate $\beta 2$. Combining both sets of measurements allows the conclusion that it is the unique ray connecting pixel $(\alpha_1, \beta_1)$ to pixel $(\alpha_2, \beta_2)$.

This concludes remarks (1) through (3), which provided additional explanation and alternate embodiments for the nature of the code transfer matrix A and the nature of the LCD layers in the illumination source.

Reverting now to the description of the how to determine multiple binary patterns for coding of a multi-layer LCD system, it is again assumed for the sake of simplicity, and without loss of generality, that the number of LCD layers is m=2. It is further assumed that both have pixel resolution N.

Notation: It is convenient to introduce an index selection notation: If T is an $n_R \times n_C$ matrix, $[r_1, r_2]$ is a row index range, and $[c_1, c_2]$ is a column index range, then $T(r_1: r_2, c_1: c_2)$ denotes the submatrix formed by the entries within the row and column index ranges. In addition, the following shorthand notations are used:

$$T(r_1: r_2,:) = T(r_1: r_2, 1: n_C) \quad \text{eq. 9}$$

$$T(:, c_1:c_2) = T(1: n_R, r_1: r_2) \quad \text{eq. 10}$$

$$T(r_1, c_1:c_2) = T(r_1:c_2) \quad \text{eq. 11}$$

$$T(r_1: r_2, c_1) = T(r_1: r_2, c_1:c_1) \quad \text{eq. 12}$$

In general, the task is: given a Code Transfer Matrix A, determine the code X that can be used to code the LCD layers. In this description, this is referred to as a Ray Coding Problem: Find X such that R=AX has unique row vectors, i.e., each ray will receive a unique (row) code vector.

One trivial solution to the Ray Coding Problem, and a starting point for the solution method described herein, is to use a binary code, e.g., Gray code, on each LCD layer while leaving the other LCD layers in the "pass through" state. The binary code on each LCD layer determines a pixel on that layer. This solution is deemed "trivial" since each LCD layer is essentially treated as independent of the other layers, thereby foregoing more optimized solutions that require all LCD layers working together. For a two-layer illumination source, when pixels on both layers are determined, a ray can be uniquely identified. The binary code requires $\lceil \log_2 N \rceil$ shots on each LCD layer, so that a minimum $2\lceil \log_2 N \rceil$ of shots are required. If G denotes the $N \times \lceil \log_2 N \rceil$ code matrix for the binary code, then this solution corresponds to matrix X given by $$X = \begin{pmatrix} G & 0 \\ 0 & G \end{pmatrix} \quad \text{eq. 13}$$

Figure 9:
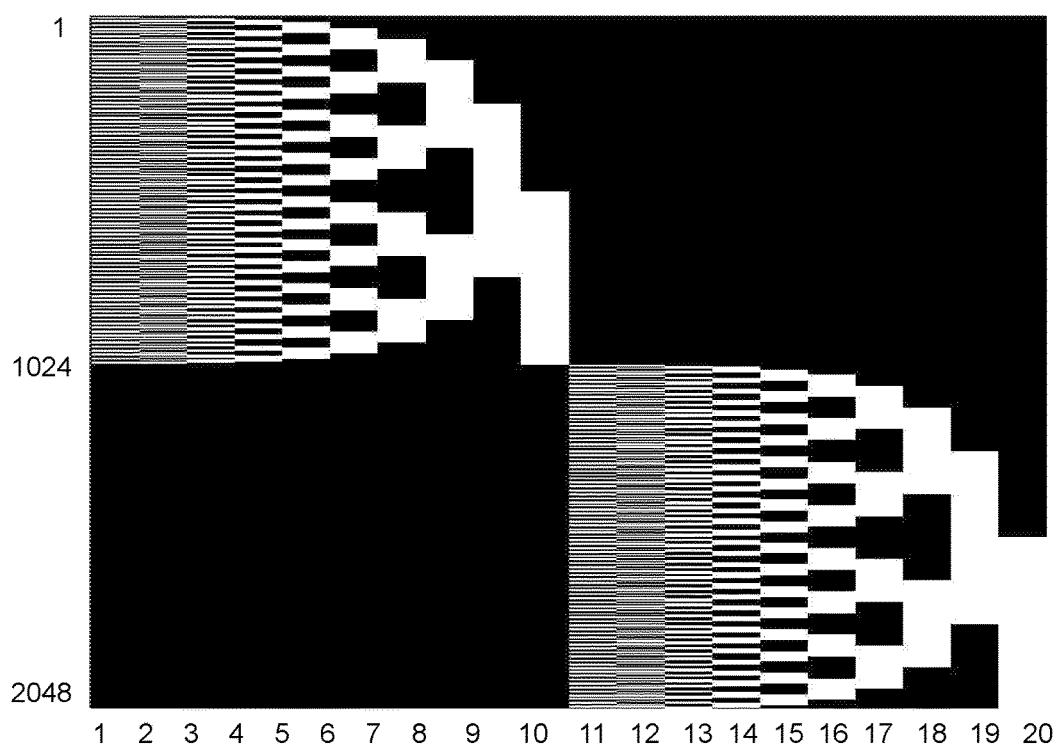
FIG. 9 is an illustration of coding on multiple LCD layers for the case of 10-bit Gray code.

A visualization of this coding on the LCD layers for the case of 10-bit Gray code is shown in FIG. 9. In FIG. 9, pixels 1 through 1024 (in the top half of the figure) are displayed by LCD layer 1, and pixels 1025 through 2048 (in the bottom half of the figure) are displayed by LCD layer 2. Each of the LCD layers is, in turn, controlled to sequentially display twenty (20) different patterns, as shown in the horizontal axis of FIG. 9. At the display of each pattern an image is captured, i.e., a "shot" is taken.

In consideration of the Gray code patterns shown in FIG. 9, when A corresponds to the full light field, that is, with the number of rays $r=N^2$ which corresponds to the case where bounding volume is infinite, the above solution is optimal in terms of number of shots, because the information theoretic bound for coding $N^2$ rays is $2\lceil \log_2 N \rceil$. When the number of rays r is smaller, typically $r \ll N^2$ because very few rays could reach the bounding volume, Gray code is not optimal.

For the case of a defined bounding volume, where the number of rays $r \ll N^2$, an exhaustive search of X to find a light field coding with least number of shots is very expensive because the search space is astronomically large. The number of possibilities is $2^{2NM}$. If N=1024 and there is a search for something even only slightly more optimal than Gray code, say using M=19 shots as opposed to 20 shots, then the number of possible combinations that must be checked is $10^{11714}$ (i.e., a "1" followed by 11,714 zeros).

This description thus rejects an exhaustive search in favor of an iterative approach involving code projection, starting from a known (although imperfect) solution. The starting point if the known solution $X_0$ such that $R_0 = AX_0$ has unique rows, where $X_0$ is of dimension $2N \times M_0$. As mentioned above, a known solution (though trivial and imperfect) is provided by the Gray code $$X_0 = \begin{pmatrix} G & 0 \\ 0 & G \end{pmatrix}.$$

Due to the linearity of the problem, if P is any $M_0 \times M$ binary matrix, right multiplying gives equation $R_0P = A(X_0P)$. Notionally, P may be viewed as a projection matrix because of the requirement that $M < M_0$, and the requirement that the rows of $R_0P$ are unique. Note also that right multiplying corresponds to column operations, i.e., mixing columns, so that this can loosely be interpreted as some kind of multiplexing binary patterns corresponding to different bit planes. Note however that this interpretation should be taken with caution because conventional multiplexing (e.g., Hadamard multiplexing) uses linear combination over real numbers, whereas the description here is using binary additions: SNR does not increase due to the peculiar nature of binary XOR addition, namely $1 \oplus 1 = 0$.

Brute force search of the projection matrix is still very expensive computationally. Because these calculations are performed off-line, with the results pre-stored for later use, some embodiments might elect to employ such a brute force search. In the solution described herein, however, the projection is broken down into elementary projections along vectors. The projection vectors are chosen to make sure that after each projection, each ray will continue to receive a unique code.

If v is a row vector in $F_2^M$, the projection matrix $P_v$ along v is an $M \times (M-1)$ binary matrix satisfying $vP_v = 0$. That is, the null space $\ker(P_v) = \{0, v\}$ and only the vector v is annihilated. In order for the rows of $R_0$ to remain unique, it is sufficient to make sure that none of the pairwise differences of rows of $R_0$ gets annihilated by $P_v$. Let D(R) be the set of pairwise differences of rows of a code matrix R:

$$D(R) = \{R(i,:)|R(j,:)|1 \le i \le j \le r\} \quad \text{eq. 14}$$

By the assumption that R has unique rows, then $0 \notin D(R)$. Note that over $F_2$, "difference" is the same as "sum" $\oplus$.

Figure 10:
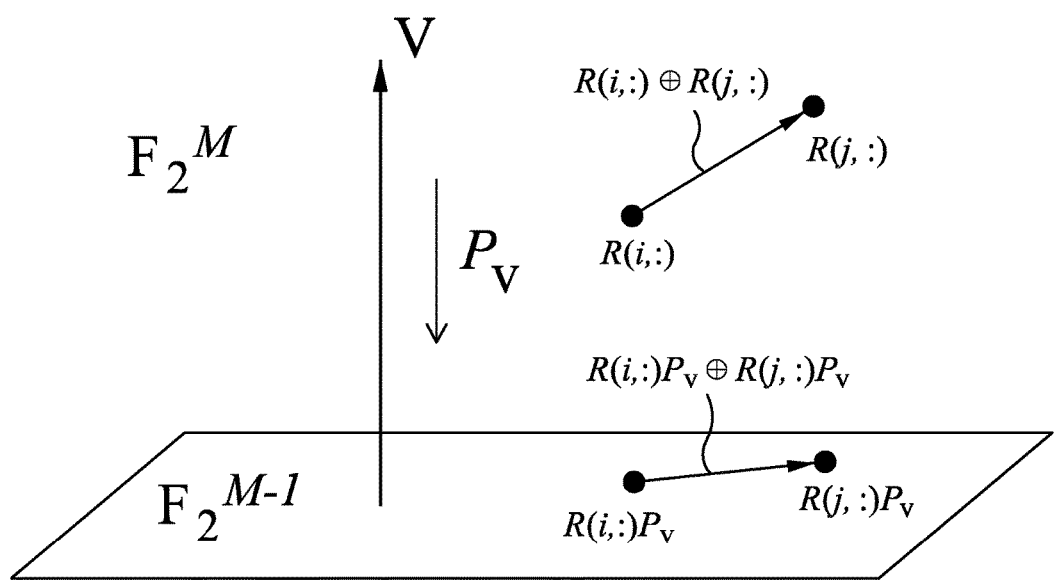
FIG. 10 is a conceptual illustration of the effects of a projection of a difference in two multidimensional code vectors to a lower-dimensional space in such a way that the difference is not annihilated.

FIG. 10 is a conceptual illustration of the effects of the projection of a difference in row vectors in a multidimensional code vector space by projection matrix $P_v$ along row vector v. In FIG. 10, the following notation is used:

R(i,:) is a row vector along row i in the code matrix
for light rays R  eq. 15

$R(i,:) \oplus R(j,:)$ is a difference between row vectors i
and j, respectively  eq. 16

$R(i,:)P_v \oplus R(j,:)P_v$ is a projection of the difference  eq. 17

As shown in FIG. 10, given a difference $R(i,:) \oplus R(j,:)$ in row vectors i and j in M-dimensional space, projection matrix $P_v$ is determined in such a way that the projection of the difference along vector v into a lower-dimensional space of M−1 dimensions, i.e., $R(i,:)P_v \oplus R(j,:)P_v$, by projection matrix $P_v$, does not annihilate the difference.

The complement set is also defined as follows:

$$\tilde{D}(R) = F_2^M \setminus (\{0\} \cup D(R)) \quad \text{eq. 18}$$

Then it is clear that any choice of $v \in \tilde{D}(R)$ will give a projection matrix $P_v$ that preserves the property of unique rows of R. If $\tilde{D}(R) = \emptyset$, then no such projection is possible. On the other hand, if $\tilde{D}(R) \ne \emptyset$, it is typically the case that $\tilde{D}(R)$ will contain many vectors, and a choice must be made of one of them, preferably an "optimal" choice in some sense of the word "optimal". As one intuition of an optimal choice, a projection vector could be chosen that that will maximize the chance of another projection. In other words, a vector v may be chosen such that $\tilde{D}(RP_v) \neq \emptyset$, or better still, such that $\tilde{D}(RP_v)$ is a large set. This is formalized by introducing the notion of Code Sparsity of X:

$$\psi(X; A) = \frac{\tilde{D}(AX)}{2^M - 1} \times 100\% \qquad \text{eq. 19}$$

where M is the number of columns of X. A locally optimal projection is a projection matrix $P_v^*$ given by a projection vector $v^*$ satisfying $$v^* = \arg\max_{v \in \tilde{D}(AX)} \psi(XP_v; A) \qquad \text{eq. 20}$$

When $\tilde{D}(AX)$ is a large set, searching through vectors in it can be very slow even for an offline calculation. Thus, an approximation is implemented to approximate the locally optimal projection by applying a heuristic filter $\mathcal{F}$ on $\tilde{D}(AX)$ to reduce the size of the search set:

$$\hat{v} = \arg\max_{v \in \mathcal{F}(\tilde{D}(AX))} \psi(XP_v; A) \qquad \text{eq. 21}$$

Several implementations of this filter are possible. Let $\|v\|_H$ denote the Hamming weight of a binary vector, i.e., the number of 1's in the vector. Three possible implementations of the filter are minimum weight filter, maximum weight filter, and random filter. The forms for these filters are given below.

Minimum Weight Filter:

$$\mathcal{F}_{MinWt}: \mathcal{F}_{MinWt}(R) = \{v \in R \mid \|v\|_H = \min_{w \in R} \|w\|_H\} \qquad \text{eq. 22}$$

Maximum Weight Filter:

$$\mathcal{F}_{MaxWt}: \mathcal{F}_{MaxWt}(R) = \{v \in R \mid \|v\|_H = \max_{w \in R} \|w\|_H\} \qquad \text{eq. 23}$$

Random Filter:

$$\mathcal{F}_{Rand}: \mathcal{F}_{Rand}(R;n) = \text{Random sampling of } n \text{ vectors in } R \qquad \text{eq. 24}$$

Empirical evidence suggests that the Minimum Weight filter (MinWt filter) performs very close to the true local optimum. It has the additional benefit that the resulting projection minimally mixes the bit planes and therefore preserves some desirable error-deterrent properties of the Gray code. The random filter performs well if n is large (e.g., n=5000), but at the expense of computation time (though still faster than searching in the unfiltered set).

In summary, the high level scheme for obtaining nearly optimal code for the LCD layers is as follows. Start with a binary code matrix $X_0 \in F_2^{2N \times M_0}$ where $M_0 = 2\lceil \log_2 N \rceil$. Find a projection vector $\hat{v}_1 \in F_2^{M_0}$ maximizing sparsity $\psi(X_0 P_{\hat{v}_1}; A)$. Then find a projection vector $\hat{v}_1 \in F_2^{M_0-1}$ maximizing sparsity $\psi(X_0 P_{\hat{v}_1} P_{\hat{v}_2}; A)$. Repeat as many times as possible, say K times, until $\tilde{D}(AX_0 P_{\hat{v}_1} P_{\hat{v}_2} \ldots P_{\hat{v}_K}) = \emptyset$. The optimized code sought for the LCD layers is then $X_0 P$ where $P = P_{\hat{v}_1} P_{\hat{v}_2} \ldots P_{\hat{v}_K}$.

Figure 11:
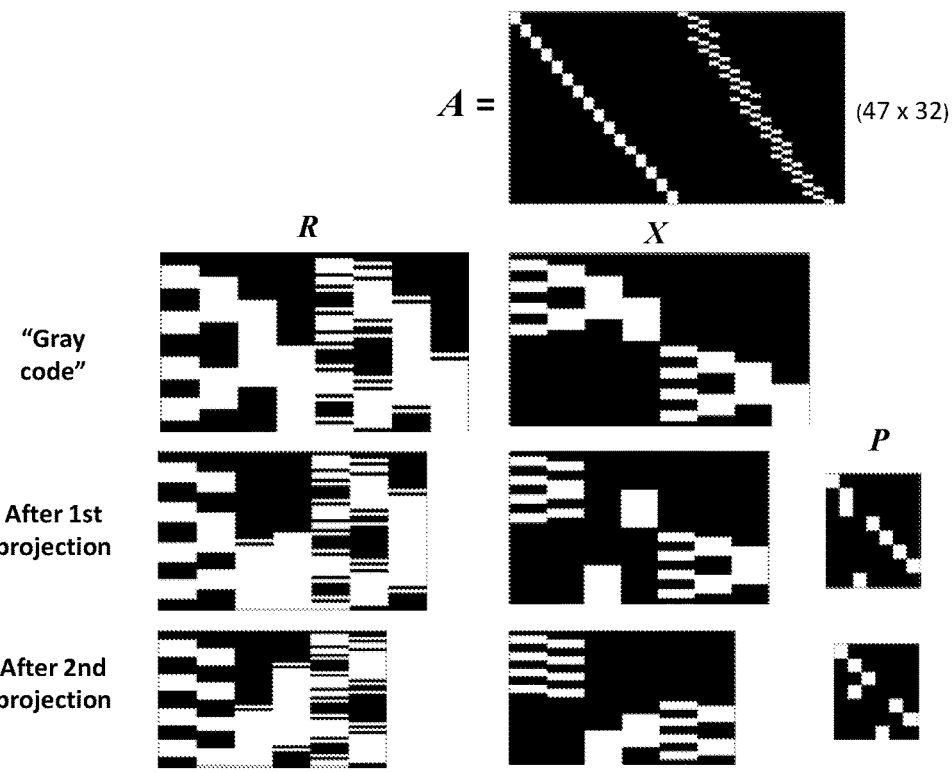
FIG. 11 is a visualization of a highly simplified example of the process of code projection.

FIG. 11 is a visualization of a highly simplified example of the foregoing process of code projection. The example of FIG. 11 is a "flatland" example in which there are two LCD layers each with N=16 pixels, and a bounding volume defined such that of the $N^2=256$ rays that could be produced by these two LCD layers, only 47 rays impact the bounding volume (which, in this flatland example, is actually a bounding "area"). As explained above, given that R=AX is a solution, then post-multiplication by matrix P yields RP=A(XP). Using a starting point of $X_0$ as a Gray code (i.e., the "trivial" solution), repeated application of the projection process yields increasingly more optimum solutions for X, each with corresponding projection matrix P. At each projection, R=AX has unique row vectors, i.e., each ray that impacts the bounding volume will receive a unique (row) code vector of increasingly shorter code length, and at each projection, there are increasingly fewer shots needed (as represented by the number of columns) to decode these rays.

EXAMPLES

The following section gives details of embodiments implementing sparse coding of exit rays from a multi-layer LCD illumination source toward a bounding volume, in accordance with the present disclosure.

Figure 12:
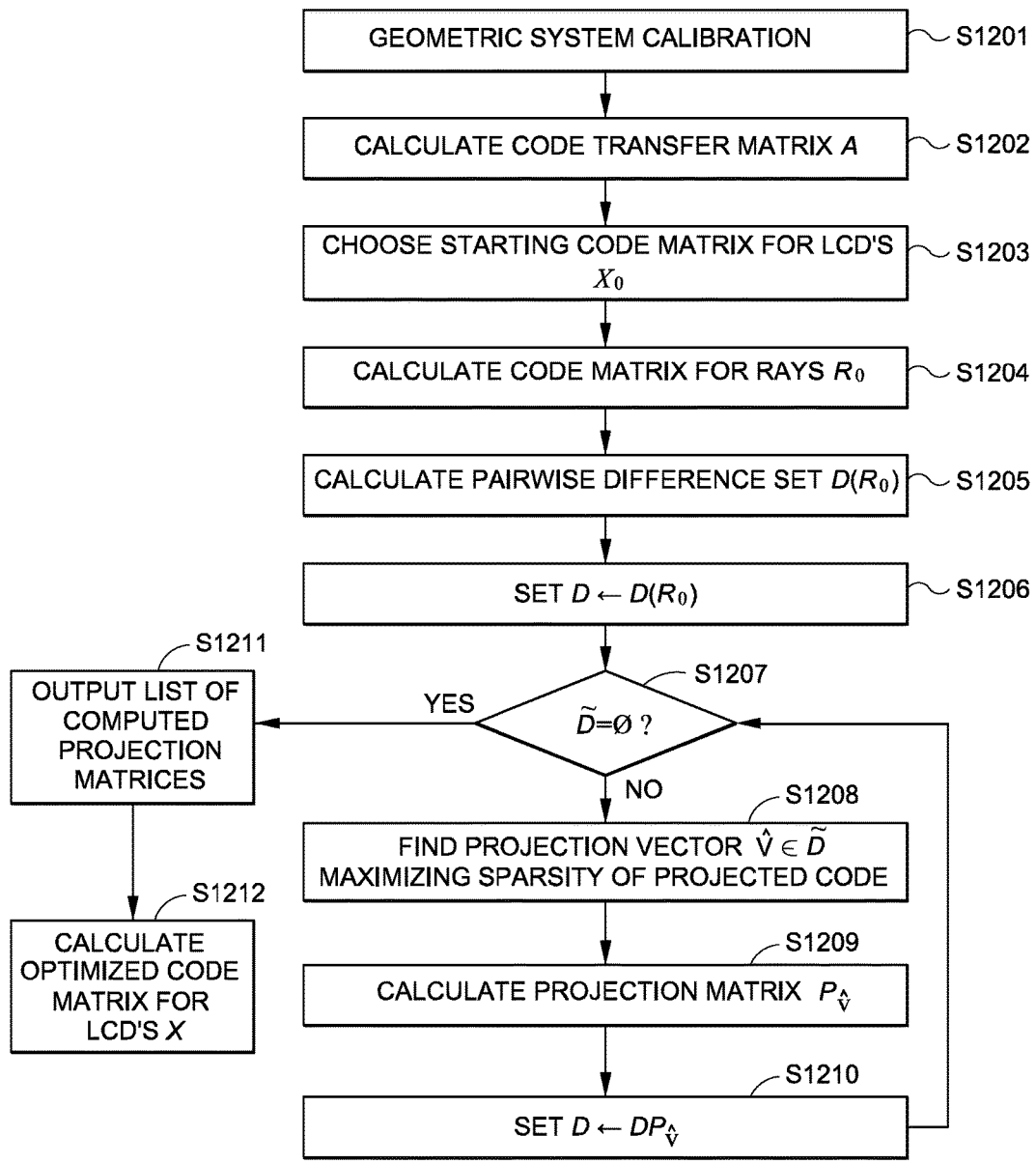
FIG. 12 is a general flow diagram summarizing the steps in computing the projection matrices.

FIG. 12 is a general flow diagram summarizing the steps in computing the projection matrices. Note that in this embodiment, all such computations take place "offline" and do not assume knowledge of shape of object to be measured other than the assumption that the object can fit within a prescribed bounding volume.

Referring to FIG. 12, step S1201 concerns geometric calibration of the LCD layers, by which the physical 3D location of any pixel on the LCD layers can be determined. A prescribed bounding volume of radius p (see numerical examples below) is assumed as a given, wherein this known bounding volume will enclose a specular object to be measured. Under a suitable coordinate system, the geometrical configuration of the dual LCD system can be modelled as shown in FIG. 13.

Figure 13:
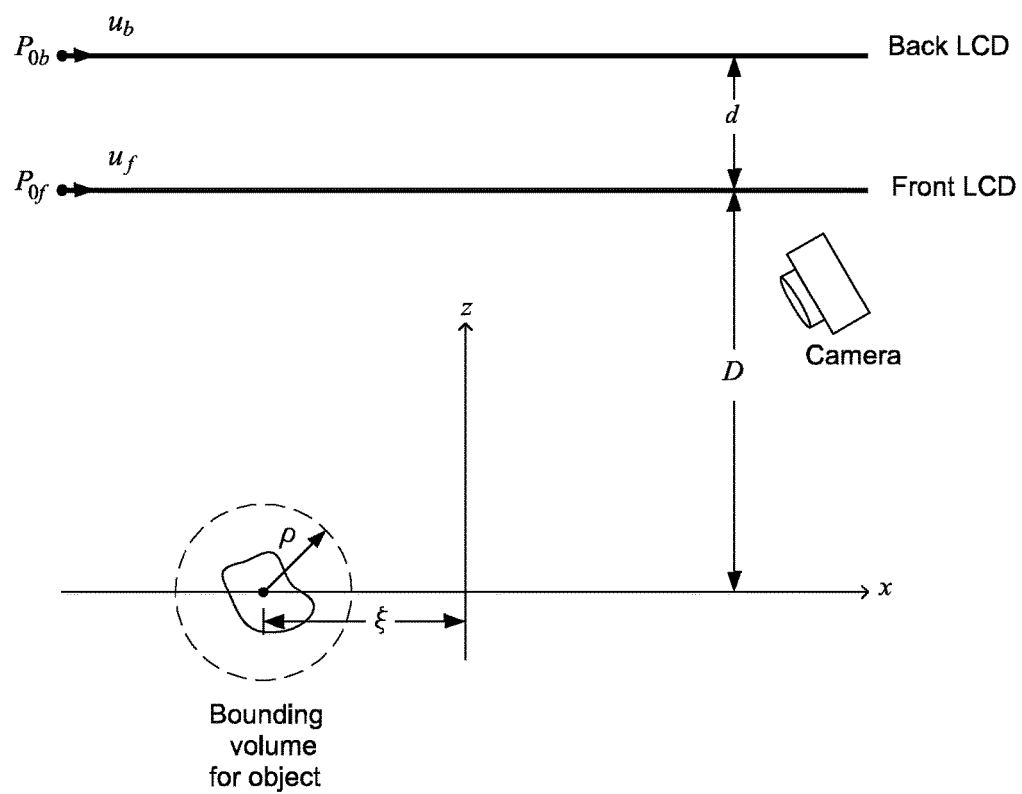
FIG. 13 shows the geometric configuration of a dual LCD system and illustrates parameters by which projection matrices may be calculated.

Without loss of generality, FIG. 13 depicts a projection of the 3D calibration data onto the xz plane. This is suitable for computing the optimized vertical patterns. Another projection of the 3D calibration data onto the yz plane would provide for computing the optimized horizontal patterns.

The bounding volume allows the exclusion of rays of the full light field that cannot possibly reach the object and can therefore be ignored in the light field coding. Specifically, the knowledge of the bounding volume and the geometric calibration of the LCDs allow the determination of the Code Transfer Matrix A where each row of A corresponds to a ray that can reach the bounding volume. The object and the camera are in the figure for better visualization; no knowledge of their shape or position is needed in determining the optimized coding.

In one embodiment, the bounding volume is modeled as a sphere (a circle in the xz plane).

Reverting back to the flow diagram of FIG. 12, step S1202 calculates the code transfer matrix A. If $0 \leq a \leq N-1$ is the pixel index on the back LCD, calibration data provides its physical location coordinates as $p_{0b} + au_b$ where $p_{0b}$ is the location coordinates of the first pixel, and $u_b$ is the pixel pitch translation vector. Similarly, if $0 \leq \alpha \leq N-1$ is the pixel index on the front LCD, calibration data provides its physical location coordinates as $p_{0f} + \alpha u_f$ where $p_{0f}$ is the location coordinates of the first pixel, and $u_f$ is the pixel pitch translation vector. The rays in the full light field are ordered lexicographically by $(a, \alpha)$, and calculation of the Code Transfer Matrix A involves masking off rays that do not reach the bounding volume. Intersecting the bounding volume with a ray connecting $p_{0b} + au_b$ to $p_{0f} + \alpha u_f$ amounts to solving a quadratic equation in t:

$$\left\| p_{0b} + au_b + t(p_{0f} + \alpha u_f - p_{0b} - au_b) - \begin{pmatrix} \xi \\ 0 \end{pmatrix} \right\|^2 = \rho^2 \qquad \text{eq. 25}$$

A mask function $$\mu(a, \alpha) = g_2^2 - g_1 g_3$$

may be defined where:

$$g_1(a, \alpha) = \|p_{0f} + \alpha u_f - p_{0b} - \alpha u_b\|^2 \quad \text{eq. 26}$$

$$g_2(a, \alpha) = \left(p_{0b} + \alpha u_b - \begin{pmatrix} \xi \\ 0 \end{pmatrix}\right) \cdot (p_{0f} + \alpha u_f - p_{0b} - \alpha u_b)$$

$$g_3(a, \alpha) = \left\|p_{0b} + \alpha u_b - \begin{pmatrix} \xi \\ 0 \end{pmatrix}\right\|^2 - \rho^2$$

With the foregoing definition of the mask function, then code transfer matrix A has a row with 1's at column positions a and N+α and 0's elsewhere whenever μ(a, α)≥0.

Step S1203 chooses a starting code matrix for the LCD layers. The starting code matrix is designated as $X_0$. As mentioned earlier, any binary code, represented as a binary code matrix $G \in F_2^N \times \lceil \log_2 N \rceil$, on individual LCD layers gives rise to a starting code matrix $X_0$ for the dual LCD system:

$$X_0 = \begin{pmatrix} G & 0 \\ 0 & G \end{pmatrix} \quad \text{eq. 27}$$

Any permutation on the N symbols {0, 1, 2, . . . , N−1} can in principle give a usable G, but in this embodiment the starting code matrix is chosen to have a large sparsity $\psi(X_0)$. A large sparsity is preferred since, in contrast, at a zero sparsity of $\psi(X_0)=0\%$, no projection can even happen.

The following table shows some typical sparsity values for four (4) different binary codes based on N=1024 and ρ=25.4 mm (1 inch). The binary codes are the following:

(1) Binary Reflected Gray Code (BRGC). This is the most well-known Gray code. (Gray, U.S. Pat. No. 2,632,058, 1953)

(2) Long-run Gray Code (LRGC). A 10-bit LRGC is given by Goddyn and Gvozdjak (Electronic Journal of Combinatorics, 2003)

(3) Natural order, i.e., the trivial permutation 0, 1, 2, . . . , N−1.

(4) Random permutation

TABLE 1

Typical sparsity values Ψ for a starting code matrix $X_0$ for binary codes (1) through (4) listed above

| $X_0$ | $\psi(X_0)$ |
|---|---|
| BRGC | 47.2348% |
| LRGC | 0.0001% |
| Natural | 47.2348% |
| Random | 0.0000% |

As demonstrated by Table 1, the trivial, natural order permutation (i.e., "Natural") has the same sparsity as the reflected Gray code (i.e., BRGC"). However, Gray code also has certain desirable error-deterrent properties. Therefore, in this embodiment, the starting code matrix $X_0$ is based on the reflected Gray code.

Steps S1204 to S1206 initialize values for the repeated iterations by which projection vectors and projection matrices are determined. Step S1204 calculates the initial code matrix for rays $R_0$, which is calculated as $R_0 = A R_0$, and step S1205 calculates the initial pairwise difference set $D(R_0)$ for the rows of $R_0$, as given above by Equation (14). In step S1206, the initial value for the pairwise difference set $D(R_0)$ is stored as the current pairwise difference D, for the current iteration.

Step S1207 determines whether the complement set is equal to the null set, i.e., if $\tilde{D}(R)=\emptyset$, where $\tilde{D}(R)$ is given by Equation (18) above. If the complement set is equal to the null set, then it is not possible to find a projection matrix $P_v$ that preserves the property of unique rows of R, thus signifying that no further projections will lead to increased optimization of the code set. In this case, flow branches to step S1211 where the list of computed projection matrices $P_{\hat{v}_1}, P_{\hat{v}_2}, \ldots, P_{\hat{v}_K}$ is outputted, and to step S1212 where the optimized code matrix X for the LCD layers is calculated. As mentioned above, the optimized code for the LCD layers is $X_0 P$ where $P = P_{\hat{v}_1}, P_{\hat{v}_2}, \ldots, P_{\hat{v}_K}$.

On the other hand, if in step S1207 the complement set is not equal to the null set, then it is possible to find a further projection matrix $P_v$ that preserves the property of unique rows of R, thus signifying that further projections will lead to increased optimization of the code set. Flow thus proceeds to step S1208, where projection vector $\hat{v}$ is found. As noted above, projection vector $\hat{v}$ is found such that sparsity of the projected code is maximized.

Step S1209 of FIG. 12 calculates the projection matrices $P_{\hat{v}}$. More generally, given a row vector $v \in F_{hu \ M} \setminus \{0\}$, the projection matrix $P_v \in F_2^{M \times (M-1)}$ calculated according to steps 1 through 5 as follows. These steps assume that v has K non-zero components.

STEP 1: Determine column positions $1 \leq j_1 < j_2 < \ldots < j_K \leq N$ such that $v(j_k)=1$ for $k=1,2,\ldots,K$.

STEP 2: Form augmented matrix $$\tilde{I} = \begin{pmatrix} I_M \\ \ldots \\ v \end{pmatrix}$$

where $I_M$ is the M x M identity matrix.

STEP 3: If $j_K \neq N$, set $\tilde{I} \leftarrow \text{Col\_swap}(\tilde{I}, j_K, N)$, where Col_swap(B, j1, j2) is a matrix obtained from B by swapping column j1 and column j2 of any matrix B.

STEP 4: For each $k=1, 2, \ldots, K-1$, replace column $j_k$ of $\tilde{I}$ by $\tilde{I}(:,j_k) \leftarrow \tilde{I}(:,j_k) \oplus \tilde{I}(:,N)$ STEP 5: Output $P_v = \tilde{I}(1: M, 1: M-1)$ As mentioned above, in some embodiment, to help with the post-processing of the captured images, such as binarization and/or thresholding of the captured images, it is common to capture also images of the "inverted patterns". For the dual LCD system, this can be done by inverting the binary pattern on one of the LCD layers, based on the law $\sim(x \oplus y) = x \oplus (\sim y) = (\sim x) \oplus y$. The choice of LCD layer to invert the pattern can be different for each shot. Formally, if $X \in F_2^{2N \times M}$ is the optimized binary code matrix for the LCD layers, an inversion selection vector may be arbitrarily chosen for each shot, $s \in F_2^M$, and a complementary binary code matrix $X_s$ may be defined by $$X_s(i, j) = \begin{cases} X(i, j) + 1 & \text{if } s(j) \cdot N + 1 \leq i \leq s(j) \cdot N + N \\ X(i, j) & \text{otherwise} \end{cases} \quad \text{eq. 28}$$

To the camera, captured patterns when displaying Xs will be inverted compared to the patterns when displaying X.

Having calculated the projection matrix $P_{\bar{v}}$ for this iteration in step S1209, flow proceeds to step S1210 of FIG. 12 to update the pairwise difference set D in preparation for the next repeated iteration. More specifically, the pairwise difference set D is updated by post-multiplication by the calculated projection matrix $P_{\bar{v}}$ for this iteration. Flow then loops back to step S1207 for the next repeated iteration.

Numerical Examples

Numerical examples are shown for two exemplary systems, a first with LCD pixel resolution of 1024×768 and a second with LCD pixel resolution of 1920×1080. Both examples illustrate a dual-LCD layer system with identical spacing between the layers. The specifics of the two systems are as follows. FIG. 13 illustrates the parameters for the spacing d between the layers, the distance D of the camera, the radius ρ of the bounding volume, and the offsets ξ in x and y directions for the bounding volume.

Example System 1: Dual LCD system of pixel resolution 1024×768; d=25 mm; D=95 mm; both LCD's have pixel pitch 0.179 mm; bounding volume center offsets are ξ=45.82 mm, ξy=0 mm.

Example System 2: Dual LCD system of pixel resolution 1920×1080; d=25 mm; D=95 mm; both LCD's have pixel pitch 0.179 mm; bounding volume center offsets are ξ=85.92 mm, ξy=0 mm.

The results shown below are based on using BRGC as starting code and the MinWt filter for selecting projection vectors.

For both of Example Systems 1 and 2, the radius ρ of the bounding volume is varied. The resulting set of binary patterns at each bounding volume size is pre-stored at 141 (see FIG. 5) for use during measurement of the shape of specular objects, as described above in connection with FIG. 6.

Another purpose in varying the radius p of the bounding volume is to investigate the effect of sparse light field. The smaller the bounding volume, the fewer the rays can reach it, resulting in a sparser light field. The word "sparse" in this context has nothing to do with code sparsity defined earlier.

In the following Tables 2 through 5, ρ is the radius of the bounding volume in inches, r is the number of sparsely-coded rays after application of the above technique, $\lceil \log_2 r \rceil$ is the informational theoretic minimum number of shots needed to code these r rays, where $\lceil x \rceil$ is the ceiling operator that gives the smallest integer greater than or equal to x, # proj is the number of shots saved compared to the number of shots needed for the starting code $X_0$, and # shots is the actual number of shots given the sparsely-coded rays. In addition, rows of the Tables highlighted with asterisks ("*") indicate that the information theoretic limit has been reached. As a reference, a Gray code solution requires 20 vertical patterns and 20 horizontal patterns.

For example system 1, with dual LCD layers and a pixel resolution 1024×768, Table 2 gives performance for vertical patterns as a function of bounding volume radius ρ, and Table 3 gives performance for horizontal patterns as a function of bounding volume radius ρ.

TABLE 2

Performance of vertical patterns relative to ρ (in inches):

| ρ (inches) | r (rays) | $\lceil \log_2 r \rceil$ | # proj | # shots |
|---|---|---|---|---|
| 1.50 | 111237 | 17 | 2 | 18 |
| ** 1.25 ** | 90794 | 17 | 3 | 17 |
| ** 1.00 ** | 71422 | 17 | 3 | 17 |
| 0.75 | 52913 | 16 | 3 | 17 |
| ** 0.50 ** | 34977 | 16 | 4 | 16 |
| ** 0.25 ** | 17393 | 15 | 5 | 15 |

TABLE 3

Performance of horizontal patterns relative to ρ (in inches):

| ρ (inches) | r (rays) | $\lceil \log_2 r \rceil$ | # proj | # shots |
|---|---|---|---|---|
| ** 1.50 ** | 75972 | 17 | 3 | 17 |
| 1.25 | 62152 | 16 | 3 | 17 |
| 1.00 | 48998 | 16 | 3 | 17 |
| ** 0.75 ** | 36336 | 16 | 4 | 16 |
| 0.50 | 24030 | 15 | 4 | 16 |
| 0.25 | 11972 | 14 | 5 | 15 |

Figure 14A:
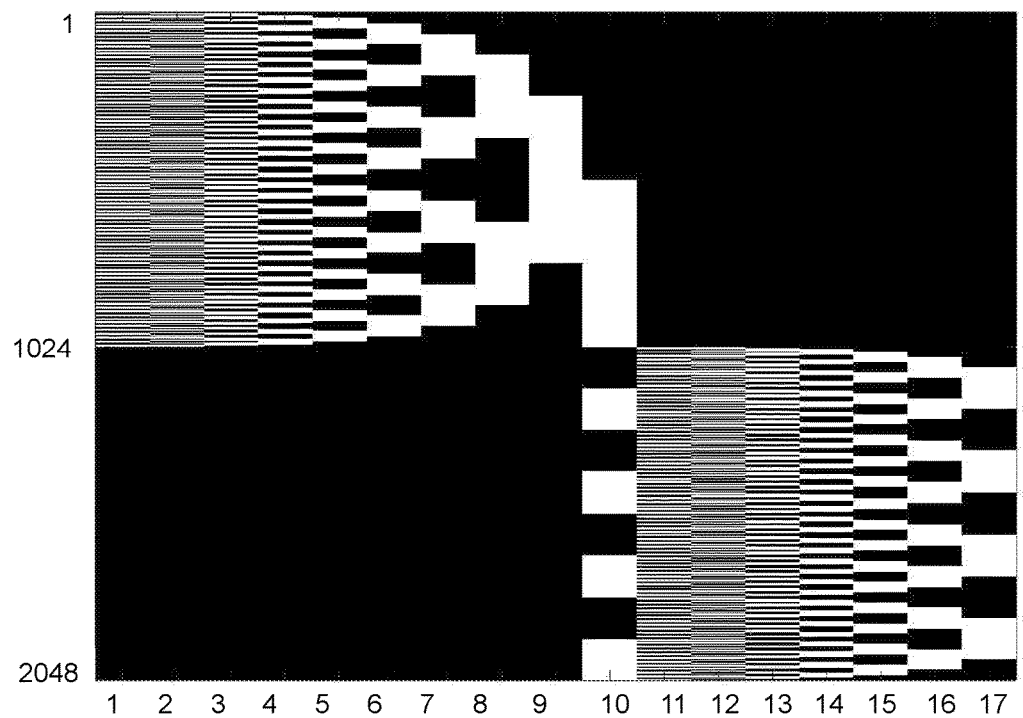
FIGS. 14(A) and 14(B) show visualizations of vertical and horizontal binary patterns, respectively, derived according to the disclosure herein, for an example system with dual LCD layers and a pixel resolution 1024×768.
Figure 14B:
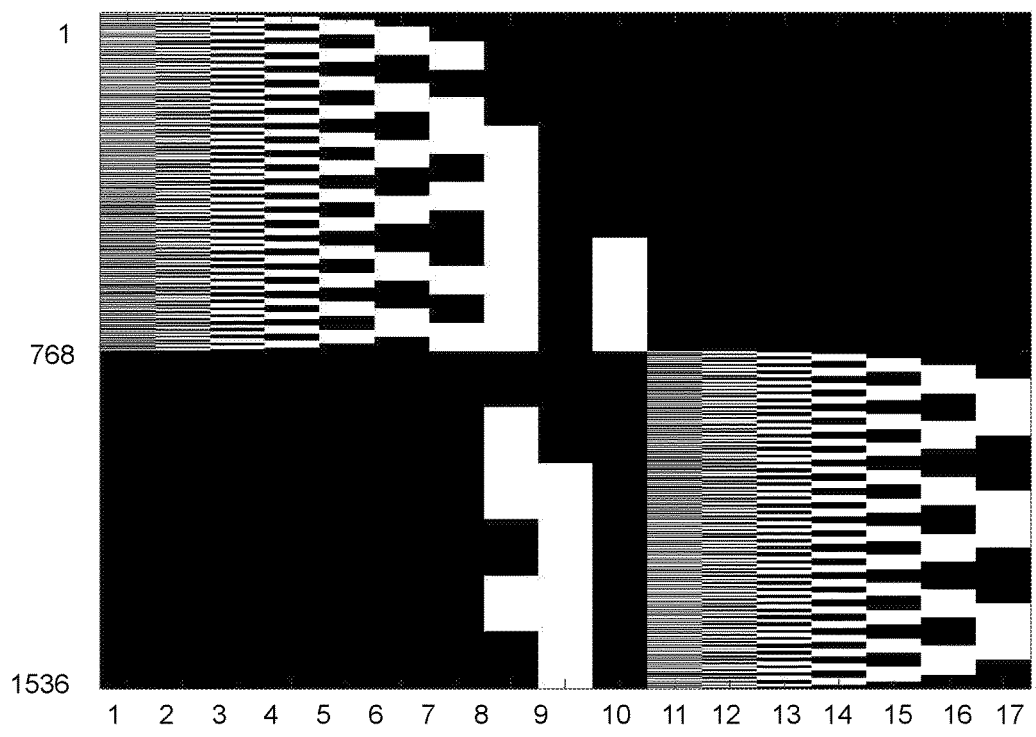

For purposes of illustration, FIGS. 14(A) and 14(B) show visualizations of the binary patterns derived according to the disclosure herein, for a fixed one of the above bounding volumes, namely, for a bounding volume of radius ρ=1.25 inches (31.75 mm). FIG. 14(A) shows vertical patterns and FIG. 14(B) shows horizontal patterns. In FIG. 14(A), pixels 1 through 1024 (in the top half of the figure) are displayed by LCD layer 1, and pixels 1025 through 2048 (in the bottom half of the figure) are displayed by LCD layer 2. In FIG. 14(B), pixels 1 through 768 (in the top half of the figure) are displayed by LCD layer 1, and pixels 769 through 1536 (in the bottom half of the figure) are displayed by LCD layer 2. Each of the LCD layers is, in turn, controlled to sequentially display respectively seventeen (17) different vertical and horizontal patterns, as shown in the horizontal axis of FIGS. 14(A) and 14(B). As compared against the patterns for a Gray code as shown in FIG. 9, where respectively twenty (20) vertical and horizontal patterns are needed for measurement of the surface profile of a specular object, it will be understood that fewer patterns are needed for a similar measurement of the surface. Sometimes the reduction in number of shots achieves the information theoretic limit. As further compared against the Gray code patterns of FIG. 9, where at any one time only one of the two LCD layers is displaying a pattern, it will be understood that there are at least some shots taken where both of the LCD layers are displaying a pattern, thus capitalizing on the XOR operation of the illumination device.

The patterns in FIGS. 14(A) and 14(B) also show that while the Gray code patterns have been modified, the high spatial frequency bit patterns remain intact. This is due to the MinWt selection algorithm for projection vectors and is a desirable property because the Gray code minimum 2-pixel width stripes allow the camera to capture the code without the need to resolve the pixel.

For example system 2, with dual LCD layers and a pixel resolution 1928×1080, Table 4 gives performance for vertical patterns as a function of bounding volume radius ρ, and Table 5 gives performance for horizontal patterns as a function of bounding volume radius ρ.

TABLE 4

Performance of vertical patterns relative to ρ (in inches):

| ρ (inches) | r (rays) | ⌈log₂ r⌉ | # proj | # shots |
|---|---|---|---|---|
| 1.50 | 261823 | 18 | 3 | 19 |
| 1.25 | 212806 | 18 | 3 | 19 |
| 1.00 | 166895 | 18 | 3 | 19 |
| 0.75 | 123322 | 17 | 4 | 18 |
| 0.50 | 81369 | 17 | 4 | 18 |
| 0.25 | 40417 | 16 | 5 | 17 |

TABLE 5

Performance of horizontal patterns relative to ρ (in inches):

| ρ (inches) | r (rays) | ⌈log₂ r⌉ | # proj | # shots |
|---|---|---|---|---|
| 1.50 | 112080 | 17 | 4 | 18 |
| ** 1.25 ** | 91572 | 17 | 5 | 17 |
| ** 1.00 ** | 72118 | 17 | 5 | 17 |
| 0.75 | 53444 | 16 | 5 | 17 |
| ** 0.50 ** | 35320 | 16 | 6 | 16 |
| 0.25 | 17594 | 15 | 7 | 15 |

Figure 15A:
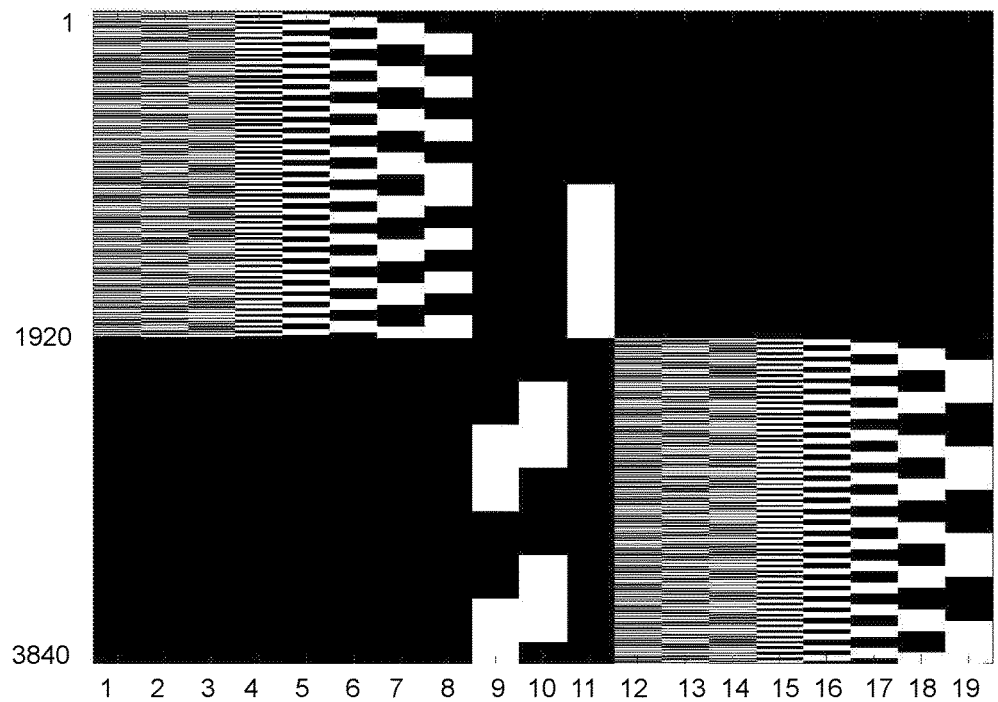
FIGS. 15(A) and 15(B) show visualizations of vertical and horizontal binary patterns, respectively, derived according to the disclosure herein, for an example system with dual LCD layers and a pixel resolution 1928×1080.
Figure 15B:
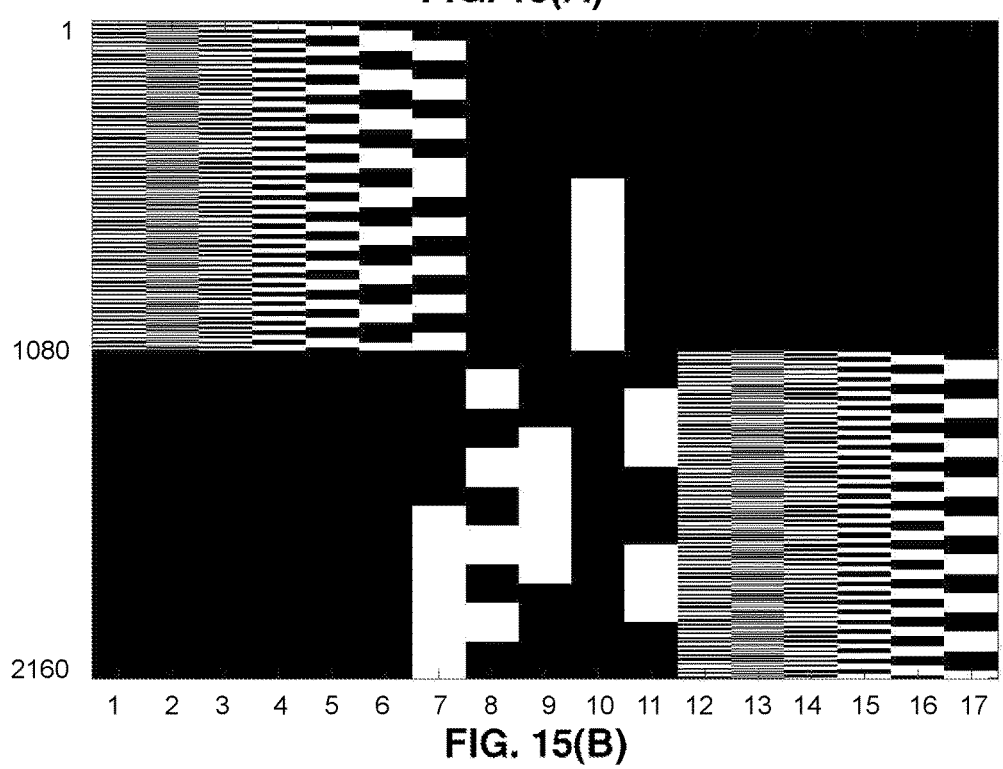

For purposes of illustration, FIGS. 15(A) and 15(B) show visualizations of the binary patterns derived according to the disclosure herein, for a fixed one of the above bounding volumes, namely, for a bounding volume of radius ρ=1.25 inches (31.75 mm). FIG. 15(A) shows vertical patterns and FIG. 15(B) shows horizontal patterns. In FIG. 15(A), pixels 1 through 1920 (in the top half of the figure) are displayed by LCD layer 1, and pixels 1921 through 3840 (in the bottom half of the figure) are displayed by LCD layer 2. In FIG. 15(B), pixels 1 through 1080 (in the top half of the figure) are displayed by LCD layer 1, and pixels 1081 through 2160 (in the bottom half of the figure) are displayed by LCD layer 2. Each of the LCD layers is, in turn, controlled to sequentially display nineteen (19) different patterns for the vertical direction and seventeen (17) different patterns for the horizontal direction, as shown in the horizontal axes of FIGS. 15(A) and 15(B). As compared against the patterns for a Gray code as shown in FIG. 9, where respectively twenty-two (22) vertical and horizontal patterns are needed for measurement of the surface profile of a specular object, it will be understood that fewer patterns are needed for a similar measurement of the surface. Sometimes the reduction in number of shots achieves the information theoretic limit. As further compared against the Gray code patterns of FIG. 9, where at any one time only one of the two LCD layers is displaying a pattern, it will be understood that there are at least some shots taken where both of the LCD layers are displaying a pattern, thus capitalizing on the XOR operation of the illumination device.

Like the patterns shown in FIGS. 14(A) and 14(B), the patterns in FIGS. 15(A) and 15(B) also show that while the Gray code patterns have been modified, the high spatial frequency bit patterns remain intact. This is due to the MinWt selection algorithm for projection vectors and is a desirable property because the Gray code minimum 2-pixel width stripes allow the camera to capture the code without the need to resolve the pixel.

<Computer Implementation>

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The invention claimed is:

1. A method for determining multiple binary patterns for use in measuring shape of a specular object positioned within a bounding volume by illuminating the object with an illumination field generated by two or more spaced apart liquid crystal layers with largely overlapping fields of view, wherein each liquid crystal layer is controlled to display the multiple binary patterns, the method comprising:

choosing multiple starting binary patterns for the liquid crystal layers for which patterns have not yet been determined;

deriving a multidimensional binary code vector in a multidimensional binary code vector space for each polarized light ray passing through the two or more liquid crystal layers and reaching the bounding volume using a logical XOR combination of values;

finding a multidimensional binary code vector for projection in the multidimensional binary code vector space;

determining a projection transformation along the multidimensional binary code vector for projection; and applying the projection transformation to the multiple starting binary patterns to obtain multiple relatively more optimized binary patterns for the liquid crystal layers.

2. The method according to claim 1, wherein the projection transformation reduces the dimension of the multidimensional binary code vector space by one, and wherein the dimension of the multidimensional binary code vector space corresponds to the number of captured images.

3. The method according to claim 1, further comprising repeating the steps of deriving, finding, determining and applying, after replacing the multiple starting binary patterns with the obtained multiple relatively more optimized binary patterns for the liquid crystal layers to obtain multiple increasingly more optimized binary patterns for the liquid crystal layers.

4. The method according to claim 1, wherein the multidimensional binary code vector for projection is found based on maximizing a code sparsity that measures a low density of the multidimensional binary code vectors for the light rays after the projection.

5. The method according to claim 1, wherein the multiple starting binary patterns are based on a binary reflected Gray code.

* * * * *